(12) United States Patent
Brandt et al.

(10) Patent No.: US 6,646,655 B1
(45) Date of Patent: Nov. 11, 2003

(54) EXTRACTING A TIME-SEQUENCE OF SLIDES FROM VIDEO

(75) Inventors: Jonathan Worthen Brandt, Santa Cruz, CA (US); Shenchang Eric Chen, Los Gatos, CA (US)

(73) Assignee: WebEx Communications, Inc., San Jose, CA (US)

( * ) Notice: Subject to any disclaimer, the term of this patent is extended or adjusted under 35 U.S.C. 154(b) by 0 days.

(21) Appl. No.: 09/265,488

(22) Filed: Mar. 9, 1999

(51) Int. Cl.[7] .................................................. G09G 5/00
(52) U.S. Cl. ........................ 345/723; 345/732; 345/719
(58) Field of Search ................................. 345/328, 330, 345/327, 302, 333, 348, 349, 329, 723, 753, 726, 732, 738; 348/13–15, 231, 232, 220, 330, 526; 704/8

(56) References Cited

U.S. PATENT DOCUMENTS

| | | | | |
|---|---|---|---|---|
| 5,485,611 A | * | 1/1996 | Astle ............................... | 707/1 |
| 5,634,018 A | * | 5/1997 | Tanikoshi et al. ............ | 345/329 |
| 5,664,073 A | * | 9/1997 | Tani et al. ..................... | 345/473 |
| 5,748,186 A | * | 5/1998 | Raman .......................... | 345/302 |
| 5,767,897 A | | 6/1998 | Howell ..................... | 348/14.07 |
| 5,790,084 A | * | 8/1998 | Hix et al. ........................ | 345/7 |
| 5,822,537 A | * | 10/1998 | Katseff et al. ............... | 709/231 |
| 5,859,623 A | * | 1/1999 | Meyn et al. ..................... | 345/1 |
| 5,990,931 A | | 11/1999 | Nimri et al. ............. | 348/14.08 |
| 5,996,008 A | | 11/1999 | Gardos et al. .............. | 709/219 |

OTHER PUBLICATIONS

Peter J. Macer and Peter J. Thomas, "Video Storyboards: Summarising Video Sequences for Indexing and Searching of Video Database," pp. 1–5, 1996.*

Jeho Nam and Ahmed H. Tewfik, "Dynamic Video Summarization and Visualization", pp. 53–56, 1996.*

Ju et al., "Summarization of Videotaped Presentations: Automatic Analysis of Motion and Gesture," IEEE, pp. 686–696, 1998.*

Komlodi et al., "Key Frame Preview Techniques for Video Browsing," ACM, pp. 118–125, 1998.*

International Search Report, PCT/US00/04013, Jul. 3, 2000, 4 pp.

* cited by examiner

*Primary Examiner*—John Cabeca
*Assistant Examiner*—Tadesse Hailu
(74) *Attorney, Agent, or Firm*—Blakely, Sokoloff, Taylor & Zafman

(57) ABSTRACT

An apparatus and method for generating a slide from a video. A slide is automatically identified in video frames of a video input stream. A digitized representation of the slide is generated based on the video frames of the video input stream.

58 Claims, 18 Drawing Sheets

EXTRACTING A TIME-SEQUENCE OF SLIDES FROM VIDEO

FIELD OF THE INVENTION

The present invention relates to the field of image processing, and more particularly to processing a video input stream to detect and process slides therein.

BACKGROUND OF THE INVENTION

Slide-augmented presentations are often video-recorded for later playback or for live remote viewing. In many cases, oral presentations are augmented by slides that are projected onto a surface and captured by a video camera. Typically, an operator positions the video camera to capture both the speaker and the slide projection, occasionally providing a close-up of the slide. In other cases, slides are inserted directly into a video stream using a video mixing system that receives slide images from a computer output. For example, a scan converter may be used to convert the VGA (video graphics adapter) output of a computer into a standardized video signal so that the video mixing system can alternately select between the scan converter and video camera feeds to generate a slide-augmented presentation.

When a video of a slide-augmented presentation is played back to a human viewer, the quality of the video may be inadequate for viewing some or all of the slides, especially if the video is digitized, downsized and compressed for delivery over a low-speed communication channel, such as a computer modem connection. Unfortunately, the options available to the viewer in this circumstance are limited. For example, even if the viewer has access to the source slides used in the video presentation, the source slides and the video presentation are typically uncorrelated. Consequently, if the viewer wishes to view the source slides as they appear in the video presentation, the viewer usually must manually identify the slide from the video, locate the corresponding source slide, and, if the source slide is stored in a computer file, open the source slide using a viewing application in the computer. Moreover, if the source slides are available in alternate languages, the viewer must manually identify the source slide in the language of choice. All these manual activities take time away from the viewer that could otherwise have been spent observing the presentation and the material in the slides, making the video presentation less effective. In presentations that include a relatively rapid sequencing of, slides, the user may be, unable to access the source slides quickly enough to track the presentation at all.

SUMMARY OF THE INVENTION

A method and apparatus for automatically generating a slide from a video are disclosed. At least one frame of the video is selected to be a first slide; and a value that indicates a time at which the at least one frame appears in the video is associated with the first slide.

Other features and advantages of the invention will be apparent from the accompanying drawings and from the detailed description that follows below.

DESCRIPTION OF THE DRAWINGS

The present invention is illustrated by way of example and not imitation in the figures of the accompanying drawings in which like references indicate similar elements and in which.

DESCRIPTION

Figure 1:
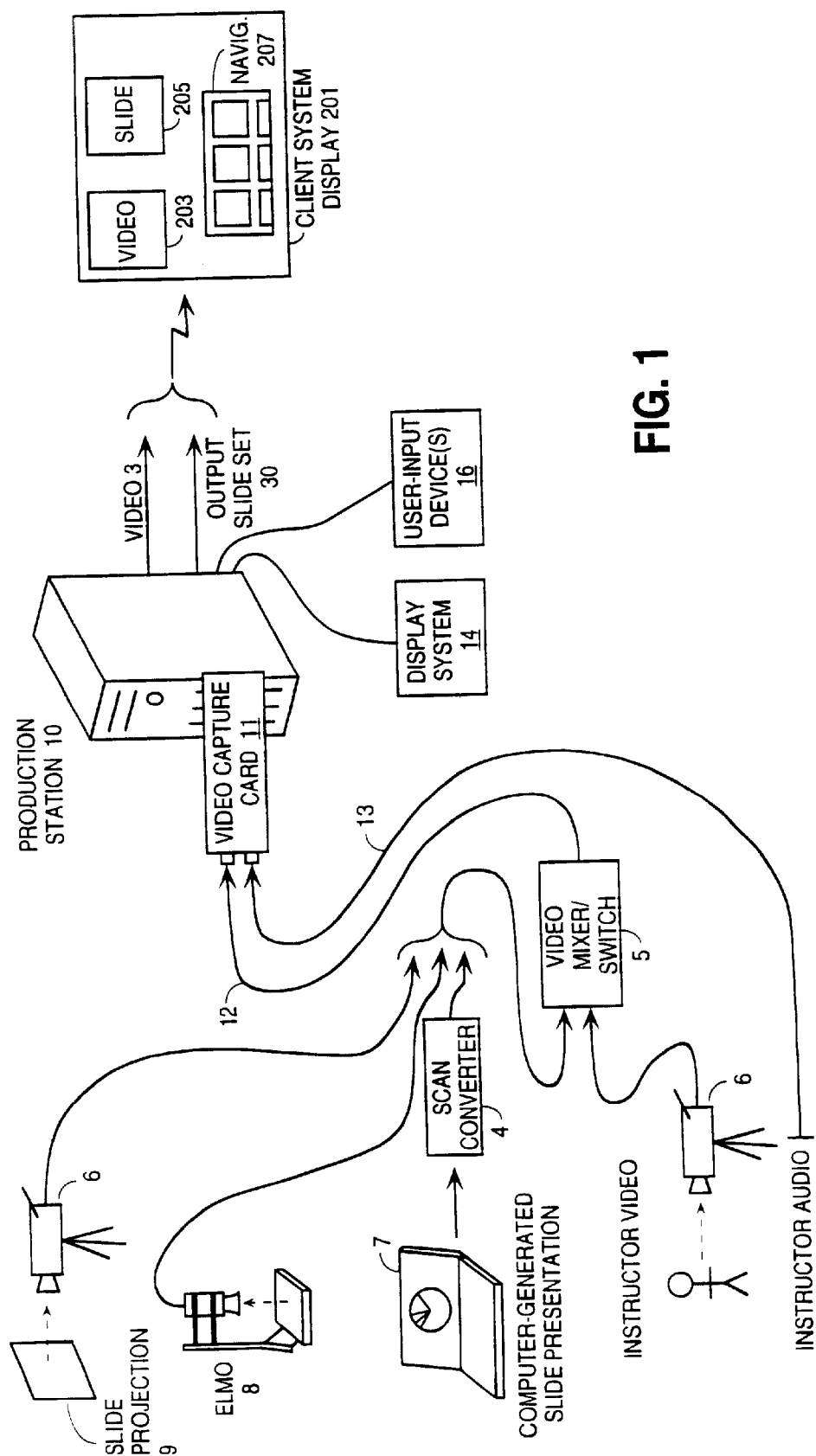
FIG. 1 depicts a production station that can be used to implement a slide extraction system according to embodiments of the present invention.

A method and apparatus for generating a set of slides from a video is disclosed in various embodiments. In an automatic slide detection embodiment, a stream of video frames is supplied to a slide detector which determines when a sequence of the frames contains a still image that corresponds to a slide. A slide generator generates an output slide based on the sequence of frames containing the still image and a slide coalescing stage discards slides generated by the slide generator that are similar. In one embodiment, the slide coalescing stage also determines when a slide output by the slide generator includes a superset of the information in the preceding slide (e.g., a extra bullet point has been added). Such slides are referred as "build" slides and the slide coalescing stage records the information (i.e., "build" information) added to the preceding slide to form the build slide. When transmitting the set of slides over a low bandwidth medium (e.g., a voice frequency telephone line), the build information may be sent in place of the entire build slide to conserve bandwidth.

If source slides are available, a substitution stage is used to identify source slides that match slides in the slide set output by the slide coalescing stage and to substitute the source slides for the generated slides in the output slide set. Because the source slides are relatively noiseless and have substantially higher resolution than counterpart slides in the video, slide substitution tends to significantly enhance the overall quality of the slide presentation. If international (i.e., different language) versions of the source slides are available, international language versions of the source slides may be automatically substituted into the output slide set to provide content that was unavailable in the original video. Also, in at least one embodiment, the slide generator enhances the quality of slides that ultimately appear in the output slide set using image processing techniques, providing sharper, higher quality slide images than are present in the video input.

According to one embodiment, the slides in the output slide set are temporally correlated to the video input stream. Consequently, when the video is played back on a computer system display, corresponding slides from the output slide set may be automatically displayed in a separate window of the display at the same time that the slide is under discussion in the video. In this way the viewer is provided with a slide presentation that automatically tracks the video and that may contain substantially higher quality images than in the video as well as content not present in the original video. Further, in at least one embodiment, thumbnail images of the output slide set are presented in a window of the computer system to allow the user to randomly access segments of the video to which the slides correspond. Thus, the thumbnail images of the slides provide a visual index into the video, allowing the viewer to quickly select subjects of interest in the video or to browse the video according to the slide contents. These and other features and advantages are described below.

Overview of a Production Station

FIG. 1 depicts a production station 10 that can be used to implement a slide extraction system according to embodiments of the present invention. Preferably the production station 10 includes a video capture card 11 for capturing video input 12 and audio input 13, a production display 14, and one or more user-input devices 16, such as a mouse and keyboard. The production station 10 also includes an output path for delivering video 3 and an output slide set 30 for presentation on the display 201 of a client system. The output path may include a computer network connection and hardware, for example, for transmitting the video 3 and output slide set 30 in a data stream for presentation in a web browsing application or other application program executed in the client system. Alternatively, the output path may be a storage media drive for writing the video and output slide set onto a removable storage device such as a compact disk or other storage media. Once delivered to the delivered to the client system, the video 3 and output slide set 30 are preferably displayed in separate windows 203, 205 of the client system display 201 along with a navigation window 207 for allowing a user of the client system to selectively view the video and slide presentations by selecting thumbnail representations of the slides. User navigation of the video and slide presentations is discussed below in further detail.

A video containing slides may be generated in a number of different ways. Herein the term "slide" is used broadly to mean any still image, and a video is said to contain a slide if a still image persists for a predetermined number of frames of the video or for a predetermined playback time. In at least one embodiment, the predetermined number of frames or playback time may be specified by an operator of the production station, and is usually set to require the still image to persist for at least several seconds worth of video frames.

Still referring to FIG. 1, one technique for generating a video containing slides is to capture an oral presentation (i.e., any moving image, such as instructor video and audio) with a video camera 6 and also to capture a projection of slides 9 with another video camera 6. A video mixer or switch 5 can be used to cut between the slides and the oral presentation. Alternatively, a single video camera 6 may be used to capture both the speaker and the slide projection, with occasional reorientation or zooming of the video camera 6 to provide close-ups of the slides. Further, the video mixer 5 may be used to generate an inset video overlay of the speaker over the slides.

Instead of capturing a slide projection 9, the slide may be captured by an overhead video camera mechanism 8 (commonly called an "ELMO") designed to generate a video image of a hardcopy document or a portion thereof. Also, a slide may be output by a computer 7 in a format (e.g., VGA) that can be converted to a standardized video signal in a scan converter 4. Generalizing from the techniques for video recording slides depicted in FIG. 1, any technique for capturing slides in a video may be used in embodiments of the present invention. Frames of slides may be alternated with frames of an oral presentation, or frames of the oral presentation may be overlaid on frames of the slides using video inset overlay techniques, or both alternating and inset techniques may be used in the same video.

Slide Extraction System

Figure 2:
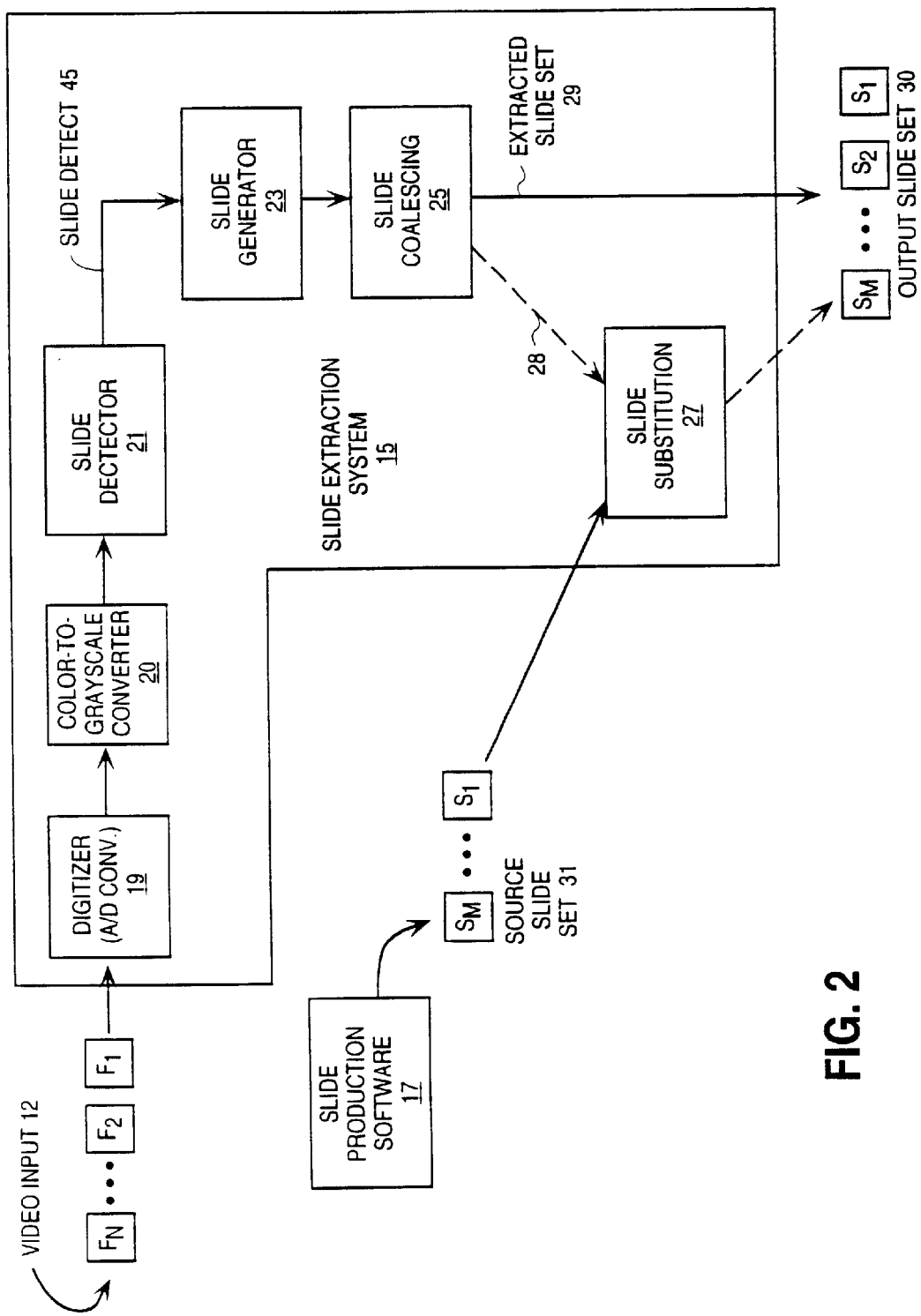
FIG. 2 illustrates an embodiment of a slide extraction system that automatically generates a set of slides based on a video input.

FIG. 2 depicts an embodiment of a slide extraction system 15 for automatically generating a set of slides 30 based on a video input 12 and that includes a digitizer 19, color-to-grayscale converter 20, slide detector 21, slide generator 23, slide coalescing stage 25 and slide substitution stage 27. The video input 12 may be any time-ordered sequence of images for which the majority of successive pairs of images in the sequence are substantially correlated with one another. Each image in the sequence of images is referred to herein as a frame in the video and the real-world subject matter represented in the image is referred to as a scene. The frames are numbered sequentially such that the $i^{th}$ frame in the sequence is designated $F_i$. Each frame has an associated time $T_i$ at which it occurs relative to the first frame in the sequence. The sequence of images comprising the video is time-ordered, so that if $i>j$, then $T_i > T_j$. The video input 12 may be provided from any including, but not limited to, film, NTSC video (National Television Standard Code) or any other analog or digital video signal format. If in analog format (e.g., NTSC video), the digitizer 19 performs analog to digital conversion on each frame of the video input 12 to produce a sequence of digitized video frames. According to one embodiment, color video is converted to grayscale by a color-to-grayscale converter 20 to simplify the slide detection process. In alternate embodiments, color-to-grayscale conversion may be omitted and slide detection is performed directly on color frames. In general, using color instead of grayscale video introduces additional but not unmanageable complexity due to the fact that vectors quantities such as, RGB, YUV or YIQ values must be processed instead of scalar grayscale values.

In a preferred embodiment, the individual stages of the slide extraction system 15 are implemented by a programmed data processing system. Thus, signals and data are passed from stage to stage by shared data, passed parameters, procedure calls, method calls (referred to as "message sending" in object-oriented programming parlance), and so forth. In an alternate embodiment, some or all of the stages of the slide extraction system 15 may be implemented at least partly by dedicated circuitry for carrying out the intended processing operations.

Still referring to FIG. 2, the slide detector 21 detects slides in the video input by determining when a scene captured in the video remains substantially unchanged for a threshold number of frames in succession (or for a threshold period of time). According to one embodiment, a captured scene is determined to be substantially unchanged during a sequence of video frames if 1) there is substantially no change in the captured scene due to change in position, orientation or zoom setting of the camera used to capture the sequence of video frames; and 2) there is substantially no foreground change in the video frames. According to one embodiment, the first criterion is determined using a motion estimation technique that generates an estimated camera motion (including zoom) between successive frames and the second criterion is determined by comparing blurred versions of successive frames that have been aligned according to the estimated camera motion between the frames. Each of these determinations is discussed below in greater detail.

Upon determining that a scene captured in the input video has remained substantially unchanged for a threshold number of frames in succession, the slide detector 21 issues a slide detect signal 45 to the slide generator 23 and maintains the slide detect signal 45 until a change in the captured scene is detected. The slide generator 23 responds to the slide detect signal 45 by generating a slide. As discussed below, slide generation ranges from selecting a representative frame of the video input 12 to be the slide, to combining a selected set of frames to generate the slide, to performing more intensive image processing operations to generate the slide.

The slide coalescing stage 25 determines when successive slides output from the slide generator 23 are duplicates (or substantially so) and discards one of the duplicate slides to reduce redundancy in the final output slide set. As mentioned briefly above, the slide coalescing stage 25 also identifies when one or more slides output by the slide generator 23 are build slides and records build information that can be added to the respective preceding slides to construct the build slides. Each of these slide coalescing operations is discussed in greater detail below.

The slides output by the slide coalescing stage 25 form an extracted slide set. The extracted slide set may itself form the output slide set or, as indicated by the dashed arrow 28 in FIG. 2, may be supplied to the slide substitution stage 27. The slide substitution stage 27 compares each extracted slide output by the slide coalescing stage 25 against a set of source slides 31 to identify a matching one of the source slides. In one embodiment, the set of source slides is produced using commercially available slide creation software 17 and stored in a computer system memory in a standardized image file format (e.g., JPEG (Joint Photographic Expert Group) or any other image file format). If a match between an extracted slide and a source slide is found, the source slide is substituted for the extracted slide in the output slide set 30. If the source slide has a corresponding descriptor file that describes the source slide in symbolic format (e.g., a markup language such as hyper-text markup language file (HTML), a text file, a graphical descriptor file, or other user-specified file format), the descriptor file may be substituted for the extracted slide in the output slide set 30. This is useful, for example, when the output slide set is destined for use in a particular application program or machine that understands a the descriptor format. For example, by transmitting a descriptor file that includes the text of a slide plus formatting and color control codes, an application program in a client system can reconstruct the slide based on the descriptor file, and tremendous bandwidth can be saved over transmission of the slide image itself.

Slide Detection

Figure 3:
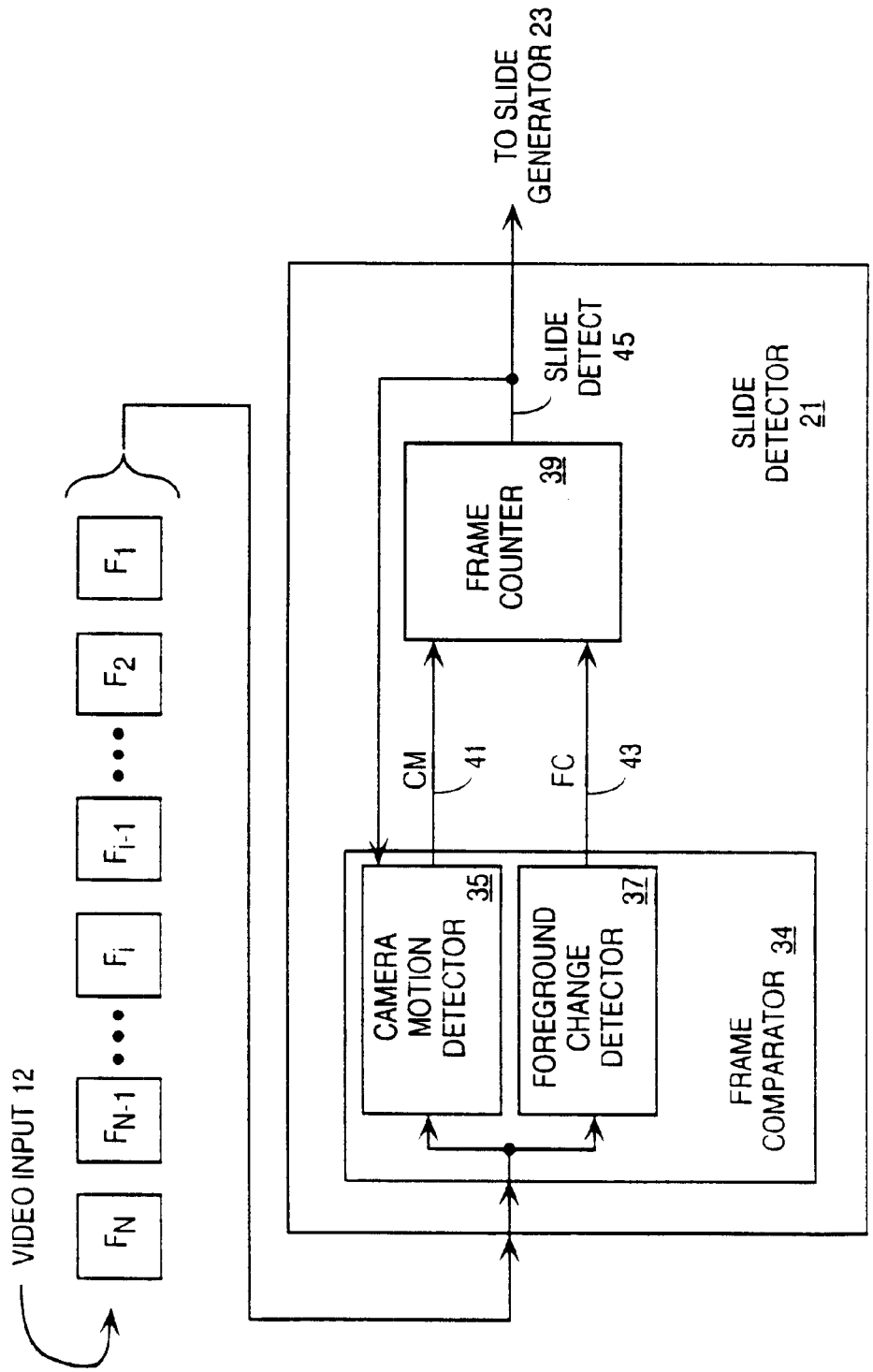
FIG. 3 illustrates a slide detector according to one embodiment.

FIG. 3 illustrates the slide detector 21 according to one embodiment. The frames of the video input 12 (digitized and preferably converted to grayscale at this point) are input to a frame comparator 34 where they are processed by a camera motion detector 35 and a foreground change detector. 37. The camera motion detector 35 outputs a camera motion vector 41 (CM) that indicates a frame-to-frame change in zoom, x-axis translation and y-axis translation of the camera used to capture the video. The foreground change detector 37 outputs a foreground change vector 43 (FC) that specifies a bounding box around an area of change between successive frames. A frame counter 39 receives the camera motion and foreground change vectors for each pair of frames compared by the frame comparator and issues the slide detect signal 45 to the slide generator 23 if both vectors remain below respective thresholds for at least a predetermined number of successive frame comparisons (or for a predetermined time). The slide detect signal 45 is fed back to the camera motion detector 35 where it is used to clear an offset/zoom accumulation stage upon transitioning from an asserted to a deasserted state.

Figure 4:
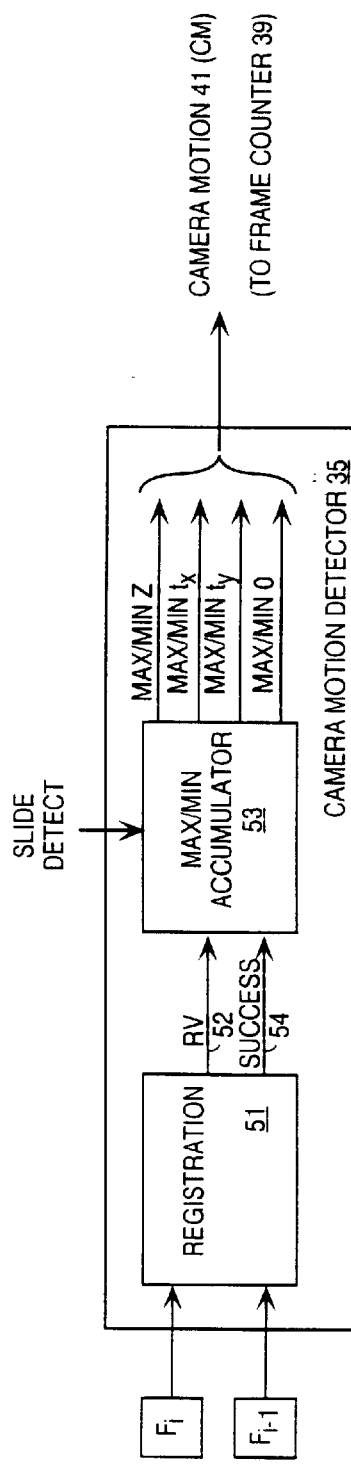
FIG. 4 illustrates a camera motion detector according to one embodiment.

FIG. 4 illustrates a camera motion detector 35 according to one embodiment. A successive pair of digitized video frames $F_i$ and $F_{i-1}$ are input to a registration stage 51 which determines a number of image warping parameters that can be applied to align frame $F_i$ to frame $F_{i-1}$. In a preferred embodiment, the registration stage 51 employs the Mellin transform, an extension of Fourier transform-based phase correlation to estimate the relative translation, zoom and rotation between two video frames. (See Davis, J., "Mosaics of scenes with moving objects", IEEE Conference on Computer Vision and Pattern Recognition Proceedings, June, 1998. pp. 354–360, for details on this registration method.) Other contemplated registration techniques include those based on feature detection, feature tracking, pyramidal processing, and optical flow estimation. In the following discussion, registration operations performed by the registration stage 51 and elsewhere within the slide extraction system are described primarily in terms of correcting for changes in zoom, rotation and translation (translation, for example, refers to image displacement in x and y axis directions caused by camera motion). However, perspective correction and other measures of image warping may be determined and output by the registration stage 51 in alternate embodiments. Also, registration stage 51 may be omitted altogether, in an alternate embodiment. The purpose of the registration stage 51 is to permit slide detection in the presence of small camera motion. If no such motion is occurring, then the content of the video frames will be aligned and registration is unnecessary. For example, if frames of the video input are received from a scan converter that is connected directly to the output of a computer, or other image generator, then camera motion will not occur.

The registration stage outputs a registration vector 52 (RV) that includes, but is not limited to, a zoom change value Z, translational offset values $t_x$ and $t_y$, and a rotation change value θ. The registration vector 52 is output to an accumulator 53 along with a success signal 54 that indicates whether the registration vector 52 is valid. If the frames $F_i$ and $F_{i-1}$ are sufficiently different from one another (e.g., due to a cut or other dramatic change), the registration stage 51 will be unable to generate a meaningful registration vector 52 and will deassert the success signal 54 to notify the accumulator. 53.

If the success signal 54 is asserted, the accumulator 53 accumulates the zoom change and translational offset into differential values referred to as the maximum/minimum zoom (MAX/MIN Z), maximum/minimum x-axis translation (MAX/MIN $t_x$), maximum/minimum y-axis translation (MAX/MIN $t_y$) and maximum/minimum rotation (MAX/MIN θ). Each of the differential values indicates the total spread between the minimum and the maximum of its respective measure since the most recent transition of the slide detect signal from true to false (or, initially, since comparison of the first and second frames of the video input). For example, if the following sequence of x-axis translations is output by the registration logic: +1,+1,+1,−1, −1,+2, (the units of measurement may be pixel values, fractions of pixel value or other distance units), then the maximum/minimum x-axis translation will be 3, because the fourth, fifth and sixth translation measurements do not expand the accumulated differential of the first three translation measurements. As indicated in FIG. 4, the differential values are each output to the frame counter and collectively form the camera motion vector. According to one embodiment, the accumulator 53 responds to a deasserted success signal 54 from the registration stage 51 by setting one or all of the differential values in the camera motion vector 41 (RV) to large values which will cause the slide detect signal 45 to be deasserted by the frame counter 39.

Figure 5:
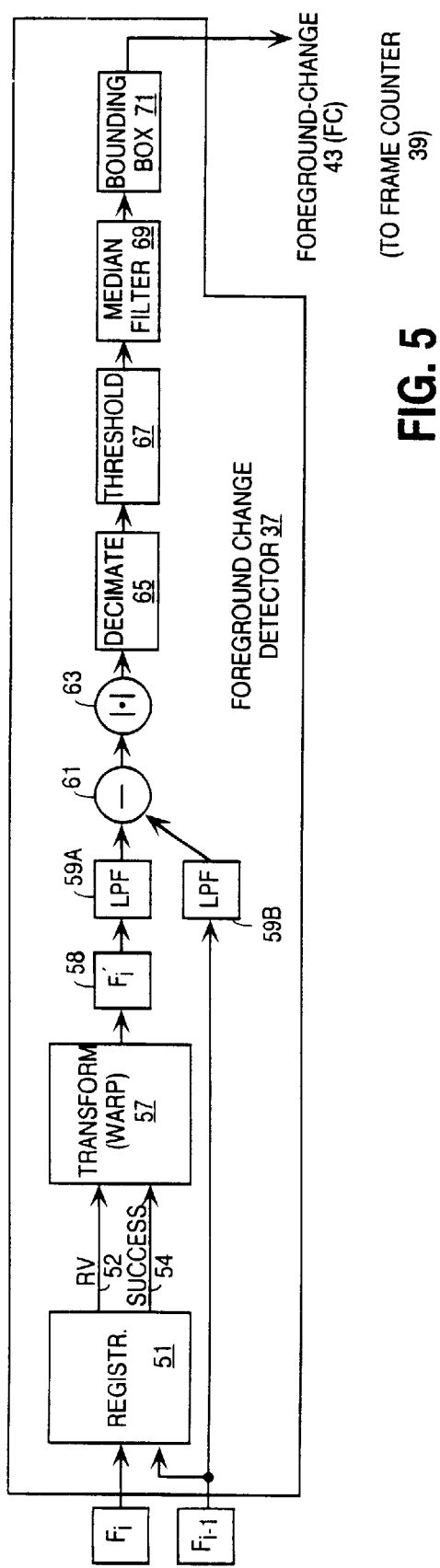
FIG. 5 illustrates a foreground change detector according to one embodiment.

FIG. 5 illustrates a foreground change detector 37 according to one embodiment. As with the camera motion detector 35, each successive digitized frame of the video input is compared with the previous frame by a registration stage 51 that generates a registration vector 52 and that outputs a success signal 54 to indicate whether the registration vector 52 is valid. In a preferred embodiment, the foreground change detector 37 and the camera motion detector 35 share the same registration stage 51 so that only one registration operation is performed per compared pair of video input frames. If the registration operation is successful, a transform stage 57 performs an image warping operation based on the registration vector to generate a warped version of the new frame 58 ($F_i'$) that is substantially aligned with the previous frame ($F_{i-1}$). The warped frame 58 and the previous frame are blurred by respective low pass filtering stages 59A, 59B and then subtracted in a subtraction stage 61 to produce a difference frame. The difference frame represents the difference between the two aligned, blurred input frames and therefore constitutes a measure of foreground change. The pixel values in the difference frame (i.e., difference pixel values) are converted to absolute value in an absolute value stage 63, decimated in a decimation stage 65, and then filtered in a median filtering stage 69. In one embodiment, the decimation stage 65 subsamples the absolute-valued difference frame, for example, by averaging each N×N pixel block of the absolute-valued difference frame to produce a single corresponding pixel in the decimation stage output (e.g., in a decimate by 8 operation, a 1024×1024 bit difference frame is decimated to a 128×128 bit difference frame). The threshold stage 67 converts each difference pixel value in the decimation stage output to one of two extreme values (e.g., black (0) or white (full-scale)) according to whether the pixel value exceeds a predetermined threshold. Thus, the output of the threshold stage 67 is a decimated-difference frame in which each constituent pixel is either white or black, the white pixels representing regions of difference between the two input frames, $F_i$ and $F_{i-1}$.

The median filter 69 removes isolated or substantially isolated black and white pixels so that only relatively dense regions of black pixels and white pixels remain in the median filter output. For example, in one embodiment, a 3×3 voting operation is performed that effectively assigns each pixel the predominant value of its neighbors (e.g., a black pixel surrounded by predominantly white pixels is replaced with a white pixel, and vice-versa).

The median-filtered difference frame is supplied to a bounding box stage 71 which determines a bounding box that encompasses the regions of the median-filtered difference frame that contain difference pixels (i.e., white pixels which represent differences between the two video input frames being compared). According to one embodiment, the coordinates of two diagonally opposed corners of the bounding box define a foreground change vector 43 (FC) and are output to the frame counter. If there are no difference regions (or substantially so) in the median-filtered difference frame, the coordinates of the diagonally opposed corners of the bounding box will converge (or nearly so).

Figure 6:
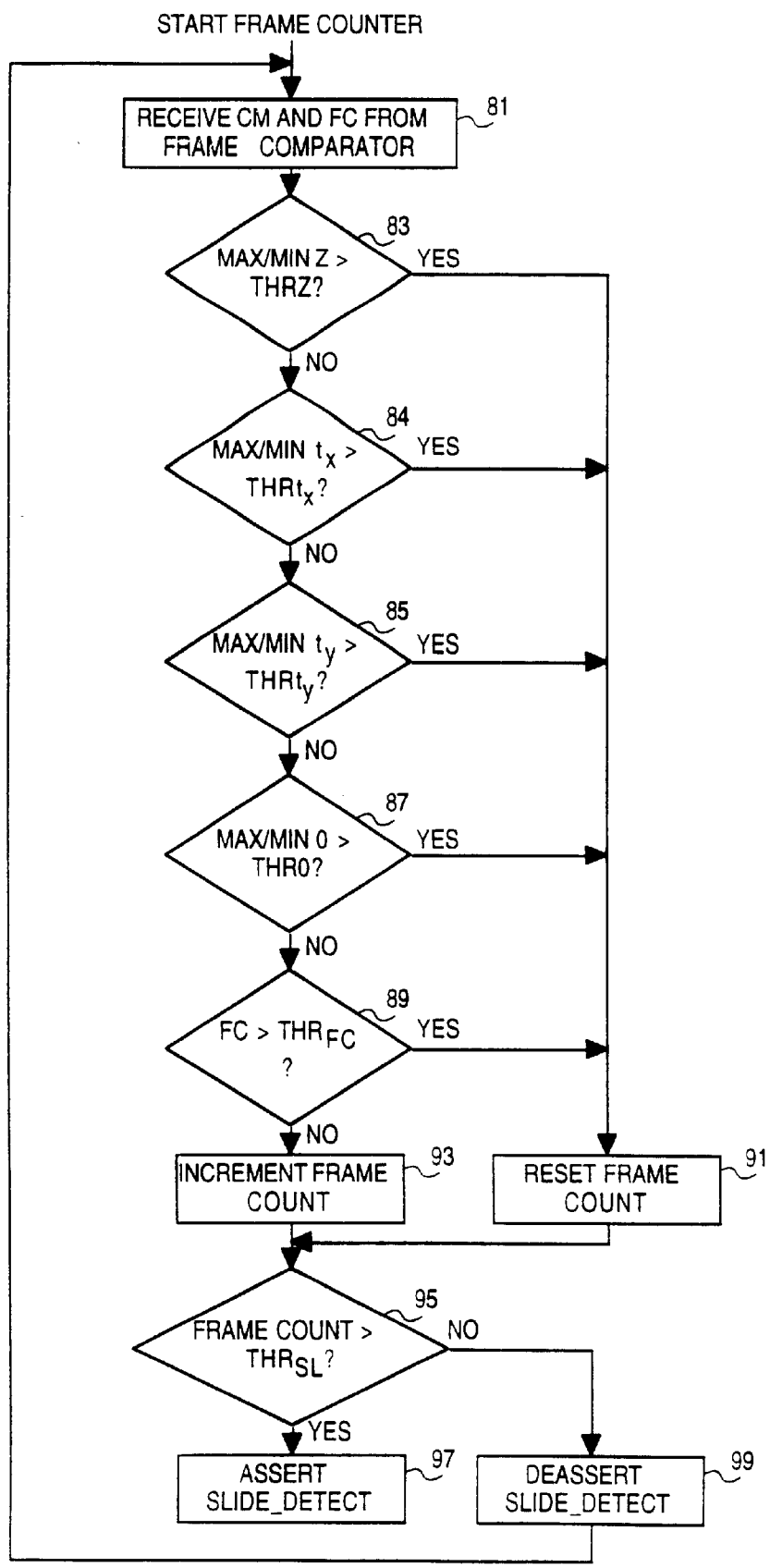
FIG. 6 is a logic diagram of a frame counter according to one embodiment.

FIG. 6 is a logic diagram of the frame counter 39 of FIG. 3 according to one embodiment. The frame counter 39 maintains a frame count value that indicates how many consecutive frames in a given video segment include substantially the same image and therefore can be considered to contain images of a slide. The frame counter 39 receives the camera motion vector (CM) and foreground change vector (FC) for each pair of video input frames compared by the frame comparator in block 81. The constituent differential values of the camera motion vector (e.g., MAX/MIN Z, $t_x$, $t_y$ and θ) are each compared to respective threshold values in decision blocks 83, 84, 85 and 87. If any of the threshold values are exceeded, the frame count value is reset (e.g., to zero) at block 91. Consequently, at decision block 95, the frame count will not exceed the threshold number of frames required to indicate a slide detection (i.e., the slide threshold) so that, if not already deasserted, the slide detect signal will be deasserted at block 99. If each of the constituent differential values of the camera motion vector are within their respective thresholds, then the foreground change vector is compared against a foreground change threshold in decision block 89. In one embodiment, the foreground change vector includes coordinates of diagonally opposed corners of a bounding box and is used to generate a foreground change scalar that indicates the size of the bounding box (e.g., a measure of the distance between the diagonally opposed corners). The foreground change scalar is then compared against the foreground change threshold to determine whether there has been a substantial foreground change in the most recently processed frame of the video input. If the foreground change scalar exceeds the foreground change threshold, the frame count is reset and the slide detect signal is deasserted as described above. If the foreground change scalar does not exceed the foreground change threshold, the frame count is incremented at block 93, after which the frame count is compared against the slide threshold at decision block 95. If the frame count exceeds the slide threshold at block 95, the slide detect signal is asserted at block 97 (or, if already asserted, then maintained in the asserted state). Otherwise, the slide detect signal is deasserted at block 99. After asserting or deasserting the slide detect signal (or maintaining the slide detect signal in its existing asserted or deasserted state), the next set of camera motion and foreground change vectors are received at block 81 and the frame counter repeats the above described operation.

Although a frame counter has been described, a timer may be used instead in an alternative embodiment. In one implementation, the timer operates similarly to the frame counter except that, instead of counting frames, the timer tracks a clock, thereby operating like a stopwatch to determine whether to assert or deassert the slide detect signal. For example, if the timer determines that the camera motion and foreground change vectors have not exceeded their respective thresholds for a predetermined elapsed time (e.g., five seconds worth of video input), the slide detect signal is asserted. Otherwise, the timer is reset to zero and the slide detect signal is deasserted.

Slide Generation

Figure 7:
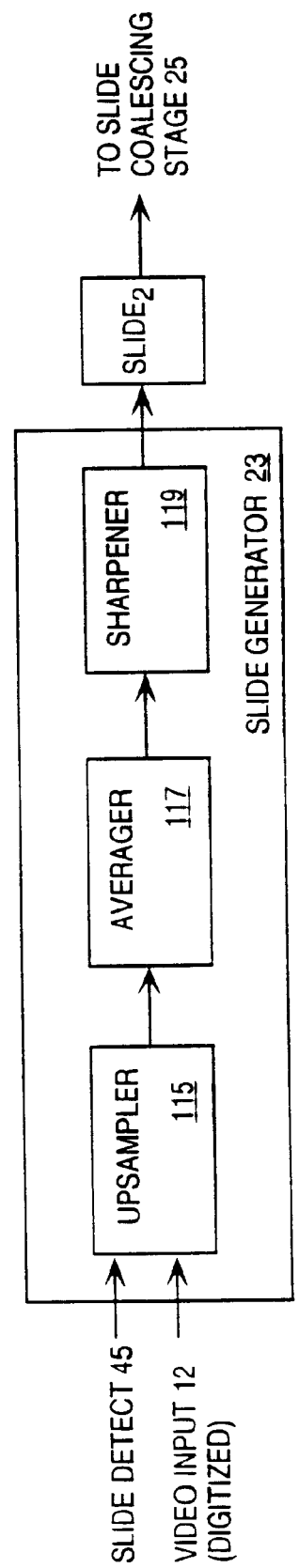
FIG. 7 is a logic diagram of a slide generator according to one embodiment.

FIG. 7 is a logic diagram of the slide generator 23 according to one embodiment. The slide generator 23 includes an upsampler 115, an averager 117 and a sharpener 119 which are used to generate a slide from the video input 12 in response to detecting assertion of the slide detect signal 45. In one implementation, the slide generator 23 selects a predetermined number (Q) of video input frames from the video input 12 after detecting assertion of the slide detect signal 45. Preferably, the slide generator selects frames that exhibit substantially no camera motion and foreground change relative to one another to avoid having to align the frames. This is not necessary however, and in an alternate embodiment, a registration stage may be included in the slide generator 23. Also, the registration vectors generated by the slide detector may be saved and associated with their respective video frames for later use in the slide generator 23 or elsewhere in the slide extraction system.

In one embodiment, the upsampler 115 upsamples each of the selected video input frames to double resolution using a high quality interpolation technique (e.g., bicubic spline interpolation) and then forwards the upsampled video frames to the averager 117. The averager 117 is used to remove noise in the upsampled video frames by averaging their constituent pixel values. That is, pixel$_i$ (i indicating the position of the pixel within a frame) of each of the Q frames is summed and then divided by Q to generate an average value pixel$_i$. To avoid loss of precision, a double precision color value is used to hold the pixel sum. For example, in a digitized color frame having 24-bit Red-Green-Blue pixel values (i.e., RGB pixel values in which three constituent bytes represent red, green and blue intensities, respectively), a 48-bit pixel value is used to hold the pixel sum so that the component intensity bytes can be summed without overflow. After dividing the sum of pixels by Q (that is, dividing the red, green and blue intensity values are separately divided by Q), the double precision pixel value is returned to the single precision format. Note that other color spaces may be used instead of RGB including, but not limited to YUV and YIQ color spaces. Also, in alternate embodiments, the Q video input frames may be combined using techniques other than averaging. For example, a standard deviation may be computed for each pixel and then used to discard outlier pixel values before selecting a median or average value. Filtering may also be used to remove noise in the Q video input frames.

The sharpener 119 sharpens the combined frame output by the averaging stage, for example, by accentuating high frequency components of the combined frame. In one embodiment, sharpening is accomplished by convolving the combined frame to produce frequency-sensitive amplification of the constituent pixels, amplification being substantially unitary (i.e., ×1) for lower pixel frequencies, but greater than unitary for higher pixel frequencies. Other sharpening techniques may also be used. After sharpening the combined frame, the resulting frame is output as a slide (SLIDE$_i$) to the coalescing stage 25.

Numerous changes may be made to the slide generator 23 without departing from the scope of the present invention. For example, either or both of the upsampler 115 and the sharpener 117 may be omitted altogether and, in the degenerate case, Q may be set to 1 so that the averager 117 is essentially pass through logic. In that case the slide output by the slide generator is effectively a snapshot (i.e., selected frame) of the video input. Also, additional image processing stages may be used to process the slide before it is sent to the coalescing stage 25.

Slide Coalescing and Build Slides

Figure 8:
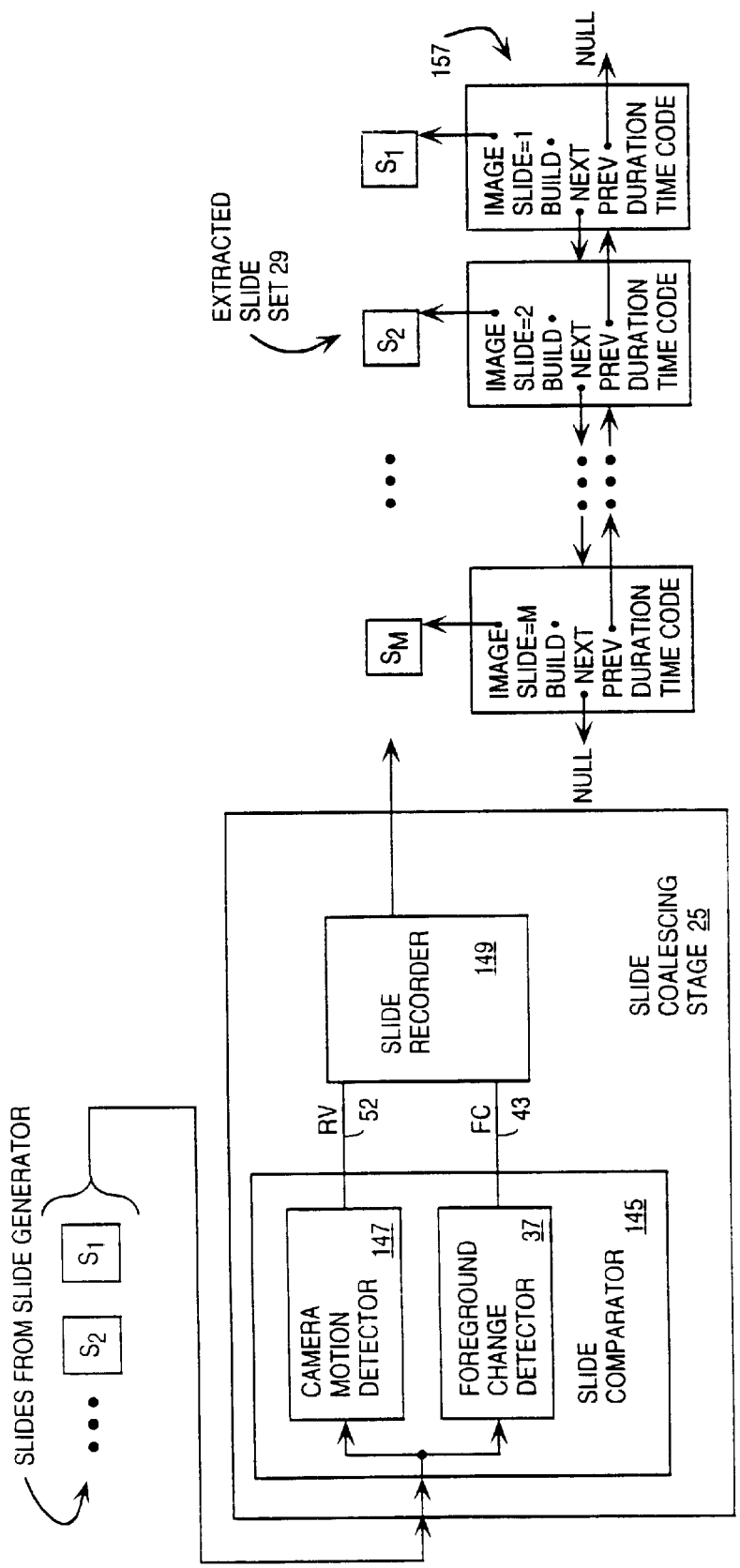
FIG. 8 illustrates a slide coalescing stage according to one embodiment.

FIG. 8 illustrates the slide coalescing stage 25 according to one embodiment. The slide coalescing stage 25 includes a slide comparator 145 and a slide recorder 149 which operate on a set of slides from the slide generator to produce an extracted slide set. In general, the extracted slide set is the same as the slide set output by the slide generator, except that redundant slides are discarded and that a linked list 157 of slide data structures 151 is associated with the extracted slide set.

In one embodiment, the slide comparator 145 operates in the same manner as the frame comparator 34 shown in FIG. 3 and described above, except that the camera motion detector within the slide comparator 145 does not output an accumulated differential value, but rather the registration vector 52 (e.g., containing component values Z, $t_x$, $t_y$ and θ) for the comparison operation.

The slide recorder 149 determines when to discard a slide (the undiscarded slides forming the extracted slide set), identifies build information and generates the linked list 157 of slide data structures 151. According to one embodiment, each slide data structure 151 includes a reference (IMAGE) to a corresponding slide in the extracted slide set, a slide number (SLIDE), respective references to the next and previous slide data structures in the linked list (NEXT, PREV), a timecode (TIMECODE), a duration (DURATION), and a reference to build information (BUILD), which is discussed below. The timecode in each slide data structure indicates a frame or time in the video input at which the slide appears and the duration value indicates how long or for how many frames of the video input the slide persists. According to one embodiment, the timecode for each slide is a frame number recorded by the slide detector 21 of FIG. 2 and indicates the first frame in the sequence of frames that caused the slide detect signal 45 to be asserted and the slide to be generated. The duration value is similarly recorded by the slide detector and indicates the final frame of the sequence of frames that caused the slide detect signal 45 to be asserted. In an alternate embodiment, the timecode and duration values may be expressed in units of time (e.g., a relative starting time and elapsed time of the video segment containing the subject slide). As discussed below, the timecode and duration values can be used to synchronize the display of the slides and the video input for example, in a multiple window display system. Also, the timecode and duration values can be used to allow a human operator to randomly access segments of a video by selecting a slide of interest and causing the video to be played back starting at the time indicated by the timecode associated with the selected slide.

Figure 9:
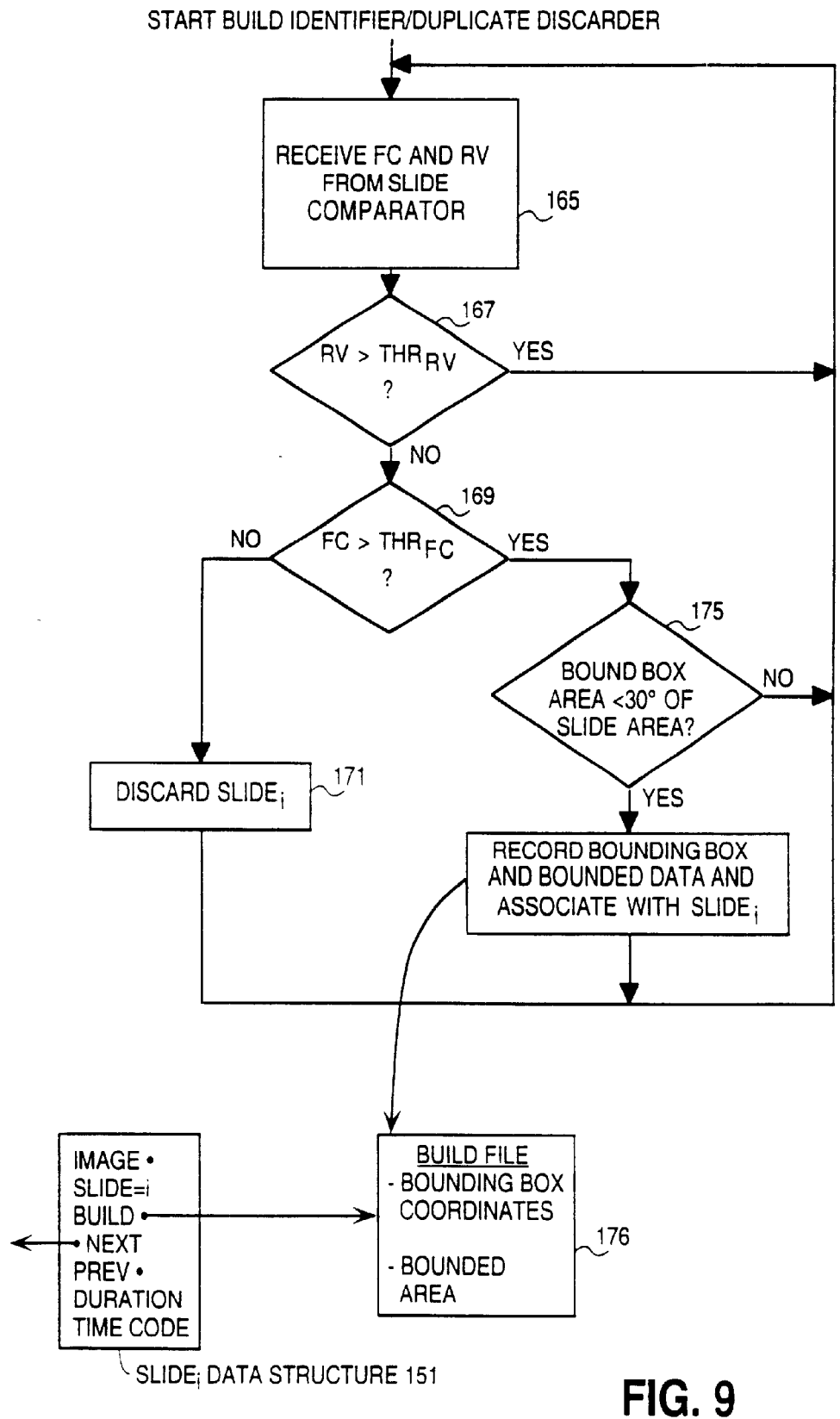
FIG. 9 illustrates a slide discard stage within the slide recorder of FIG. 8 according to one embodiment.

FIG. 9 is a diagram of build identification and duplicate discard logic within an embodiment of the slide recorder 149 of FIG. 8. At block 165, the foreground change vector (FC) and registration vector (RV) are received from the slide comparator. If, at decision block 167, the registration vector is determined to exceed a registration threshold (e.g., if Z, $t_x$, $t_y$ or θ exceed their respective thresholds), then $slide_i$ is considered to be sufficiently different from $slide_{i-1}$ to be maintained in the extracted slide set. If the registration vector does not exceed the registration threshold, then the foreground change vector is compared against the foreground change threshold at decision block 169. As discussed above, one way to compare the foreground change vector against the foreground change threshold is to generate a scalar value based on the distance between the corners of the bounding box defined by the foreground change vector and to compare the scalar value against a scalar threshold. If the foreground change vector does not exceed the threshold, then $slide_i$ is not sufficiently different from $slide_{i-1}$ to be maintained in the extracted slide set and is discarded. In an alternate embodiment, $slide_{i-1}$ may be discarded instead of $slide_i$ or additional criteria (e.g., length of corresponding video segment, etc.) may be used to determine whether to discard $slide_i$ or $slide_{i-1}$.

If the foreground change vector exceeds the foreground change threshold, then at decision block 173, the foreground change vector is inspected to determine if it defines a bounding box having an area greater than 30% of the total area of $slide_i$ (threshold percentages other than 30% may be used and the threshold percentage may be user-configurable). If so, then $slide_i$ is assumed to be a build slide that has been created by adding material to $slide_{i-1}$. If $slide_i$ is determined to be a build slide at decision block 173, then the bounding box corner coordinates and pixel data within the bounding box are recorded in a build file 176 or other data structure. Also, the build reference (BUILD) within the slide data structure for $slide_i$ is modified to identify the build file 176 and therefore to associate the build information in the build file 176 with $slide_i$.

The build information in the build file 176 is particularly useful when the final output slide set is to be transmitted over a low-bandwidth communication path, such as a voice frequency transmission line (typically 64 kilobits/second or less). In that case, the build information associated with a build slide can be transmitted instead of the build slide and the client system can construct the build slide from the build information and the preceding slide. In this way, transmission of the redundant portion of the build slide is avoided, thereby saving significant bandwidth and providing for a smoother overall client-side slide presentation.

Still referring to FIG. 9, if the bounding box area is more than 30% of area of $slide_i$, then $slide_i$ is not considered to be a build slide and the build reference in the $slide_i$ data structure is set to a null value.

Slide Timecode Generation

Figure 10:
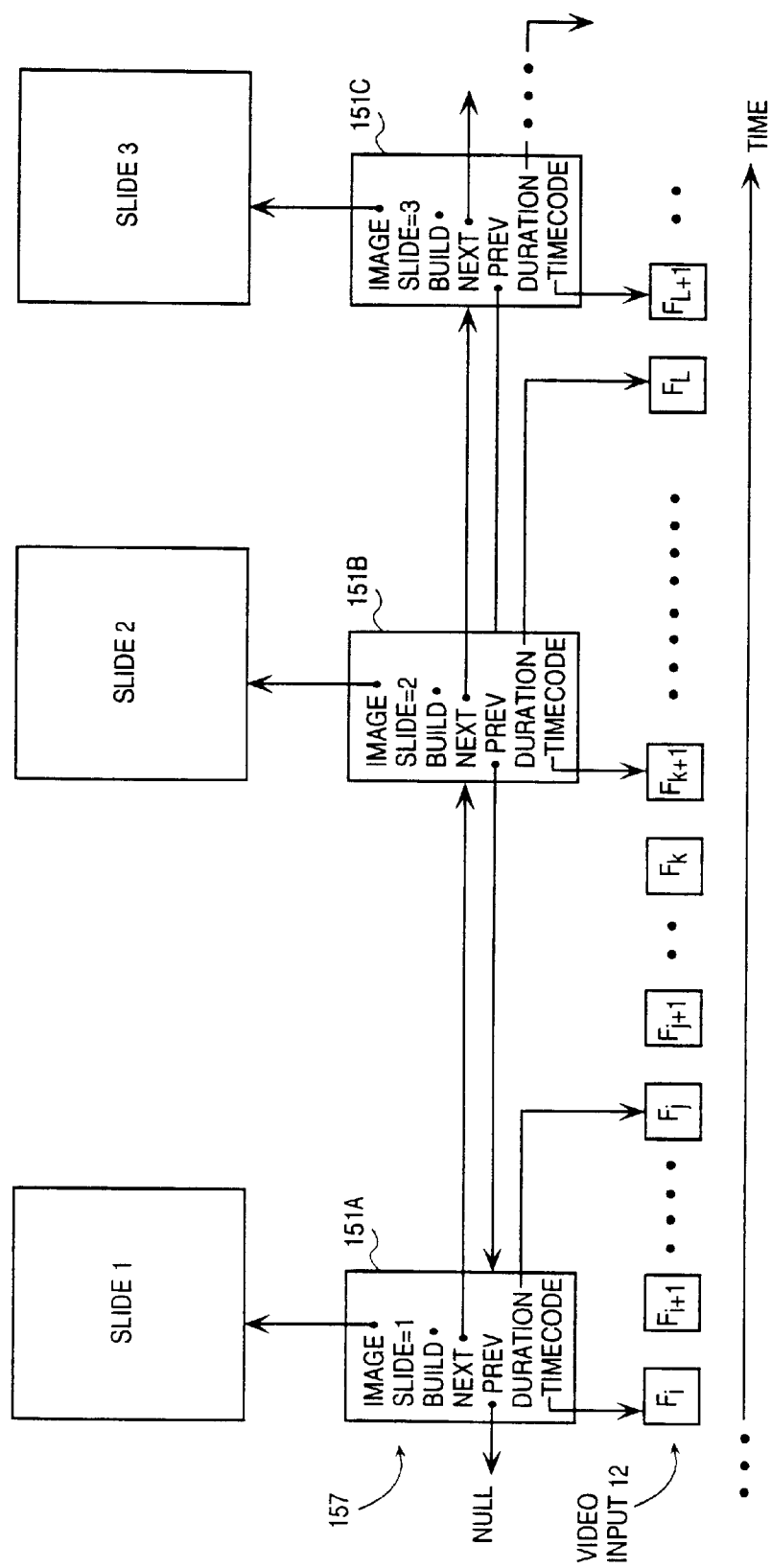
FIG. 10 illustrates a time sequence of slides according to one embodiment.

FIG. 10 illustrates a time sequence of slides according to one embodiment. As discussed above, each of the slide data structures 151A–151C in the linked list 157 includes a timecode and duration that indicate, respectively, the starting frame and ending frame of a video input segment in which the slide appears. For example, the timecode in the slide data structure 151A indicates that slide 1 first appears in the video input at frame $F_i$. Similarly, the duration value in the slide data structure 151A indicates that slide 1 last appears in the video input at frame $F_j$. In this way, the timecode and duration value of the slide data structure 151A specify frames $F_i$ to $F_j$ as the video segment in which slide 1 appears. Timecodes and duration values in slide data structures 151B, 151C similarly specify the video segments in which slides 2 and 3 appear. As discussed below, the timecodes and duration values in the linked list 157 of slide data structures 151A–151C may be used to synchronize the display of the slides and the video and to allow a user to playback selected segments of the video by choosing slides of interest.

Slide Substitution and Internationalization

Figure 11:
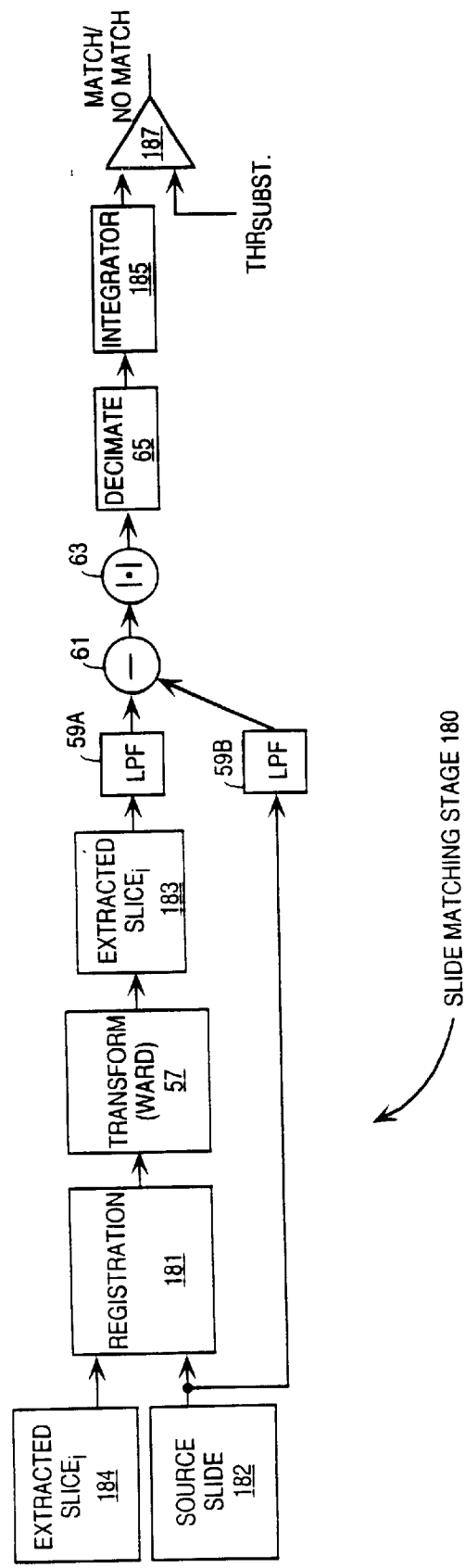
FIG. 11 illustrates a slide matching stage within the slide substitution stage of FIG. 2 according to one embodiment.

FIG. 11 illustrates a slide matching stage 180 within the slide substitution stage 27 of FIG. 2 according to one embodiment. In at least one implementation, the slide matching stage 180 is used to compare each slide in the extracted slide set against slides of a source slide set until a match is found. For example, if there is an equal number of slides in the source slide set and in the extracted slide set, M, and exactly one source slide corresponds to each extracted slide, then M(M+1)/2 slide comparison operations are made by the slide matching stage 180. The number of slide comparisons will vary if there is an unequal number of source and extracted slides or if no matching source slide is found for one or more of the extracted slides.

Although slide extraction processing operations prior to the slide substitution stage 27 can be performed in real time (i.e., keeping up with standard video feed rates), the relatively large number of slide comparisons per extracted slide may require that slide substitution be performed off line, after the extracted slide set is completed. However, the ability to perform real-time slide substitution is a predominantly a function of the processing load (i.e., the number of source slides) and the available processing power so that, in cases where the number of source slides is sufficiently small or where there is sufficient processing power, slide substitution may also be performed in real time. Also, other circumstances may reduce the number of slide comparisons, thereby permitting real-time slide substitution even in less powerful systems. For example, the source slides may be ordered according to sequence of appearance in the video (or substantially so) so that fewer slide comparisons per extracted slide are required.

Still referring to FIG. 11, a registration stage 181 and a transform stage 57 within the slide matching stage are used to generate a registered extracted slide 183 that is aligned with the source slide 182. The registration stage 181 and the transform stage 57 operate similarly to the registration and transform stages described above in reference to FIG. 5, except that image preprocessing may be performed within or prior to the registration stage 181 to remove frame borders in the extracted slide 184. In addition, the image size of the source slide 182 may be reduced to match the video frame size of the extracted slide 184. The registered extracted slide 183 and the source slide 182 are each filtered in respective low pass filters 59A, 59B and then input to a subtraction stage 61. The subtraction stage 61 subtracts the pixel values of one filtered slide from the other to generate a difference slide. An absolute value stage 63 converts the difference pixel values in the difference slide to an absolute value and then a decimation stage 65 decimates the absolute-valued, difference slide to a smaller-dimensioned, decimated slide. An integrator 185 sums the absolute-valued difference pixels in the decimated slide to generate a scalar value that represents a measure of difference between the extracted slide 184 and source slide 182. In alternate embodiments, values other than a pixel sum may be used to represent the measure of difference between the source slide 182 and extracted slide 184 including, but not limited to, a median difference pixel value, an average difference pixel value, a variance value, a standard deviation value and so forth. The measure of difference between the extracted and source slides (i.e., the output of the integrator 185) is compared with a substitution threshold in a comparator 187. If the measure of difference exceeds the threshold, then the slides are considered not to match, and another yet-unmatched source slide is selected and compared with the extracted slide 184. If the measure of difference does not exceed the threshold, then the source slide 182 is considered to match the extracted slide 184 and is substituted for the extracted slide 184 in the final output slide set (i.e., slide set 30 of FIG. 2). According to one embodiment the substitution threshold is set relatively high so that multiple matches may occur. In that case, the match with the smallest measure of difference is selected.

As discussed above, the extracted slide set has an associated linked list of slide data structures. In one embodiment, substitution of the matching source slide for the extracted slide involves modifying the image reference (i.e., a pointer, filename or other reference) in the slide data structure that identifies the matched extracted slide so that the image reference identifies the source slide instead. Other substitution techniques may be used such as: combining the source slide into a file or storage folder with other slides in the final output slide, set in place of the matching extracted slide. According to one embodiment, once a source slide is matched with an extracted slide, the source slide is indicated to be a matched source slide so that it is not compared against subsequent extracted slides during the remainder of the slide matching effort.

Figure 12:
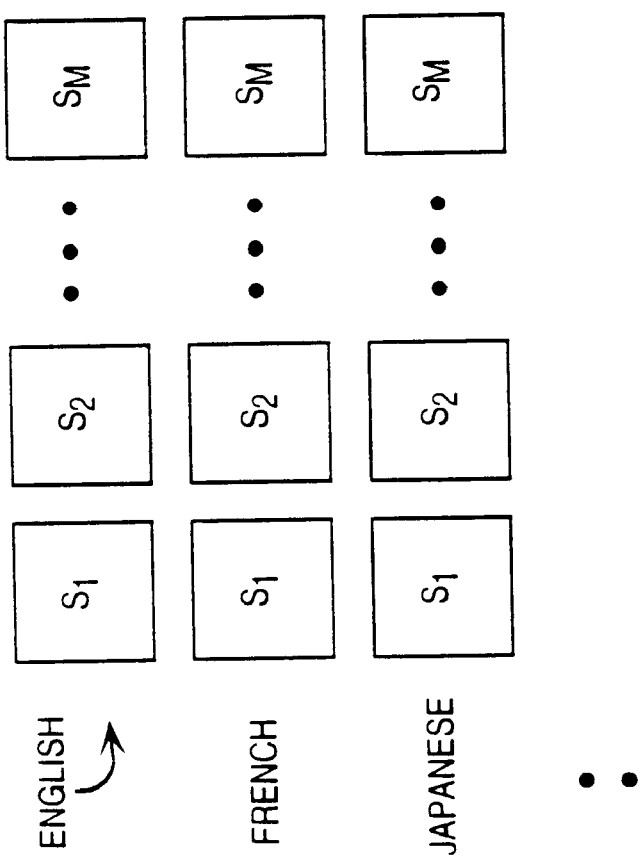
FIG. 12 illustrates a plurality of source slide sets that are each in a different language and that can be used for automatic internationalization of the output, slide set.

Although Returning briefly to FIG. 2, that while image-based source side set 31 is preferably compared against may FIG. 12 illustrates a plurality of source slide sets 191 that are each in a different language (i.e., the text in the slides of a given set is in a different language than text in slides of the other sets). If the individual slides of the different language slide sets 191 are correlated with one another (e.g., by filename, correlating data structure or other technique), the slide substitution stage can automatically internationalize the output slide set according to user preferences. For example, if the English language source slide set is captured in a video and used by the slide extraction system to generate a set of extracted slides, then the user may select to have a corresponding Japanese, French or other language source slide substituted into the output slide set instead of the English language source slide. The language selection may be indicated by menu selection in an application program prior to starting the automatic slide extraction and substitution operations.

Slide-Based Navigation and Playback of a Source Video

Figure 13:
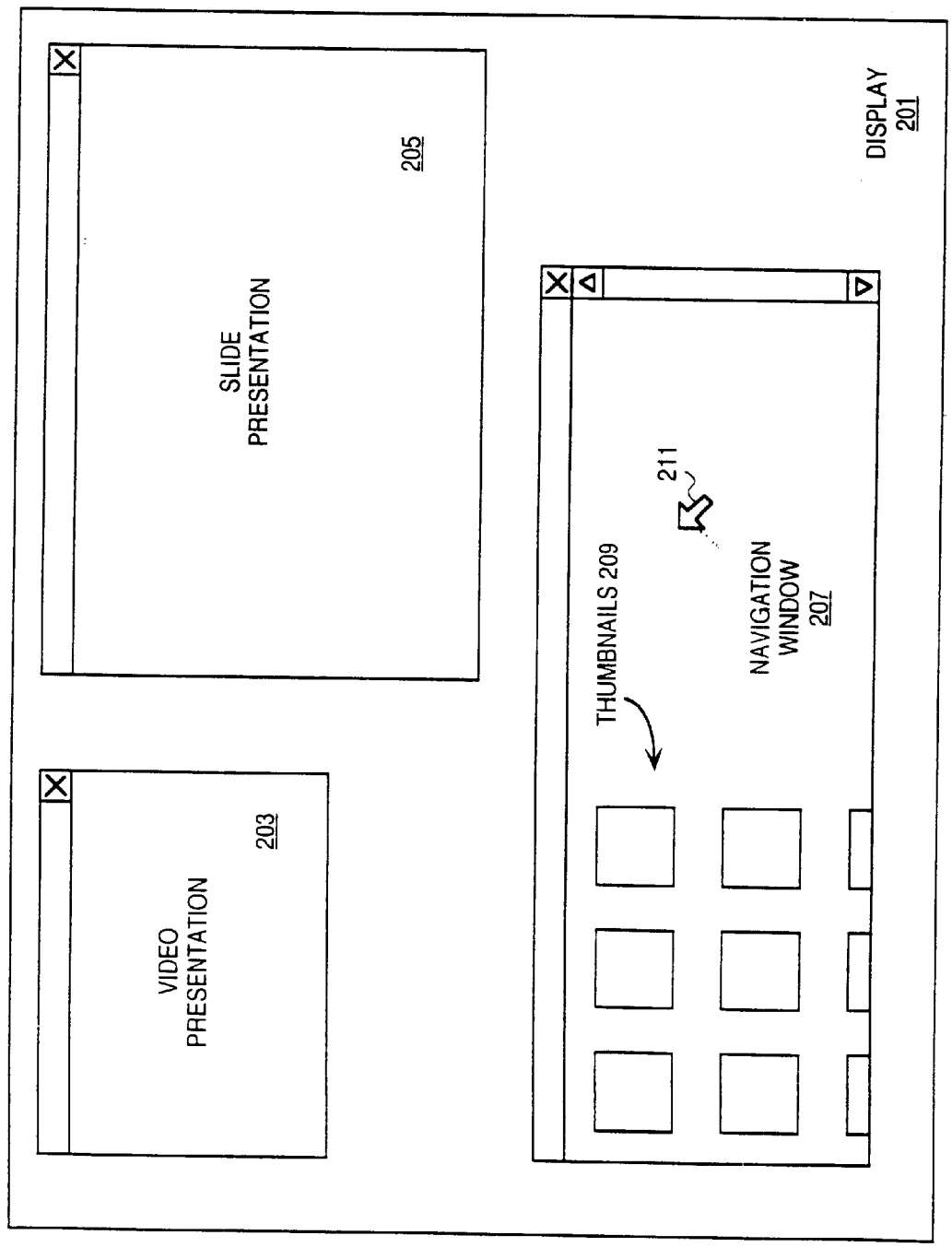
FIG. 13 is a computer display that illustrates the manner in which an output slide set may be used to select video segments of interest in a video from which the output slide set has been extracted.

FIG. 13 is a computer display 201 that illustrates the manner in which an output slide set may be used to select video segments of interest in a video from which the output slide set has been extracted. According to one embodiment, the slides of the output slide set are represented by a corresponding set of thumbnail images 209 (i.e., miniaturized images of the slide content) in a navigation window 207. By selecting a thumbnail of a slide of interest (e.g., by moving a screen cursor 211 over the thumbnail and clicking a mouse button), the corresponding slide is presented, in a slide presentation window 205 and the video is presented in a video presentation window 203 starting at the point in the video at which the selected slide first appears. As new slides appear in the video, the corresponding slides in the output slide set are automatically presented in the slide presentation window 205, thus automatically tracking the video presentation with enhanced or internationalized slides. If the user selects another thumbnail of a slide of interest in the navigation window 207, the video skips forward or back to the start of the corresponding video segment for the newly selected slide and playback continues from that point.

As discussed above, the slide extraction system of FIG. 2 may be operated in real time. Consequently, a live video presentation may be presented in the video presentation window 203 while slides are extracted from the video and displayed in the slide presentation window 205. In a system with sufficient processing power or with a sufficiently small source slide set, source slide substitution may also be performed in real time so that a source slide, including an internationalized version of the source slide, may be presented in the slide presentation window 205 substantially in time with the appearance of the slide in the video presentation.

When a video and slides are delivered for real-time presentation via a low bandwidth network or a network that exhibits transmission latency or bandwidth fluctuation, it may be necessary to transmit slides (or video) in advance of their actual time of presentation in order for the slides to be displayed in synchronization with the video. For example, in one embodiment, slides are transmitted to a client system in advance of a corresponding video and buffered in the client system. The slides are then removed from the buffer and presented in the client system in synchronization with the video according to the above described timing values that relate the slides with respective segments of the video.

Slide Detection and Generation in the Presence of an Inset Video Overlay

Often, a video that is instructional in nature contains segments that consist of a sequence of slides with an inset video overlay of the speaker talking, or some other activity. Such segments are often interspersed with other types of shots, such as a full-framed shot of the speaker talking embodiments of the present invention provide for video inset overlay detection within a video that contains other types of shots, and the detection and generation of an underlying slide in the presence of a video inset overlay.

Video Inset Detection

In one embodiment, a video inset detector is used to inspect frames of a video input and to set a Boolean attribute INSET_DETECT$_i$ to TRUE or FALSE for each frame $F_i$ according to whether a video inset is detected in the frame. A TRUE value of the attribute for a particular frame indicates that a video inset is present in that frame, while a FALSE value indicates that a video inset is not present in that frame. As discussed below, the INSET_DETECT attribute can be used by the slide extraction system to extract slides from a video that contains a video inset by masking off the video inset in frames containing the inset. Also, the video inset itself may be extracted an substituted for the inset frame. In this way, a video that contains a series of slides with an inset video of a speaker or other non-still image can be bifurcated into separate presentations of enhanced quality slides and expanded video.

Inset Value Computation

Figure 14:
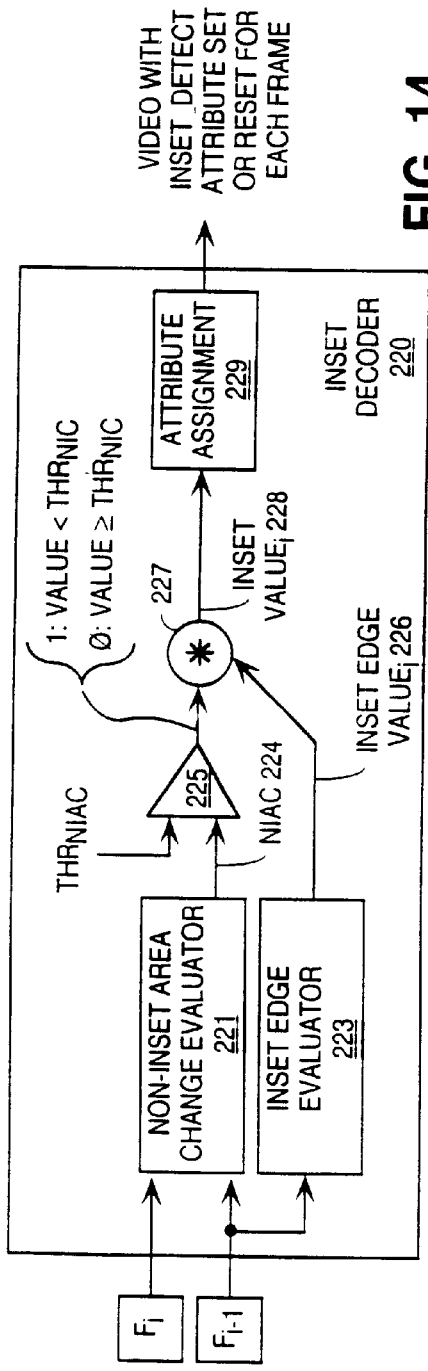
FIG. 14 illustrates an inset detector according to one embodiment.

FIG. 14 illustrates an inset detector according to one embodiment. The inset detector includes at least three main components: a non-inset area change detector 221, an inset edge evaluator 223 and an attribute assignment stage 229. The non-inset area change evaluator 221 generates a non-insert area change value (NIAC) 224 that indicates the amount of change between successive frames in the area of the video frame not covered by the inset area. The NIAC value 224 is compared with a non-insert area change threshold $THR_{NIAC}$) in a comparator 225. If the NIAC value 224 exceeds the threshold, the comparator 225 outputs a zero value, otherwise it outputs a one value.

In one embodiment, the inset area is a fixed rectangular region within the video frame that is defined by the user prior to processing. For instance, the user might translate and size a bounding box of a rectangular region defining the inset area through mouse-based interaction. In alternative embodiments, the inset area may be automatically identified through edge detection and other image processing techniques.

Still referring to FIG. 14, the inset edge evaluator 223 generates an insert edge value 226 (INSERT_EDGE_VALUE$_i$) for each video input frame, $F_i$, the insert edge value 226 being approximately proportional to the presence or absence of brightness transition edges along the vertical and horizontal edges of the inset area closest to the center of the video frame. In one embodiment, the insert edge value is multiplied by the output of the comparator (i.e., one or zero) to generate an inset value 228 (INSET_VALUE$_i$) for the frame under inspection ($F_i$). In an alternate embodiment, a multiplexer may be used to output either the insert edge value 226 or a zero value to be the inset value 228 according to the output of the comparator 225.

Figure 15:
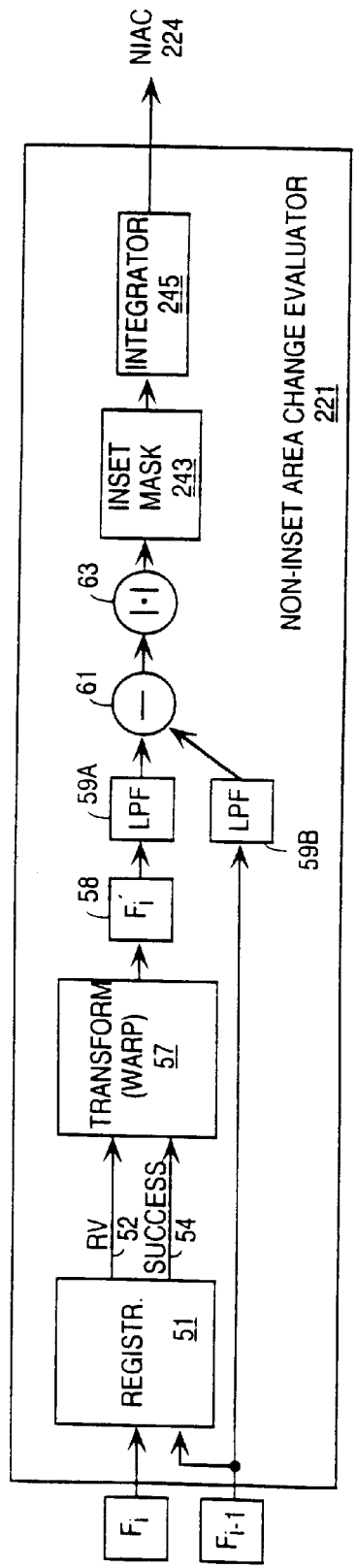
FIG. 15 illustrates a non-inset area change evaluator according to one embodiment.

FIG. 15 illustrates a non-inset area change evaluator 221 according to one embodiment. The non-inset area change evaluator 221 includes a registration stage 51 that outputs a registration vector 52 and a success vector 54 to a transform stage 57, a pair of low pass filters 59A, 59B, a difference stage 61, an absolute value stage 63, an inset mask stage 243 and an integrator 245. In one embodiment, the non-inset area change evaluator 221 operates identically to the foreground change detector 37 of FIG. 4 through the stage 63 at which the absolute value of the registered difference is evaluated. As with the foreground change detector, the registration and transform stages (51, 57) may be omitted from the non-inset area change evaluator 221 in systems or circumstances in which camera motion is negligible. The inset mask stage 243 receives the absolute-valued difference frame from absolute the value stage 63 and sets all of the difference pixels within the designated video inset area to zero. This operation nullifies the effect of changes in the video inset area. An integration stage 245 sums all the pixels in the mask stage output to form a single scalar value that expresses the degree of change in the non-inset area between successive, registered frames. This value is the NIAC value 224 that is applied to the comparator stage of the inset detector 220.

Figure 16:
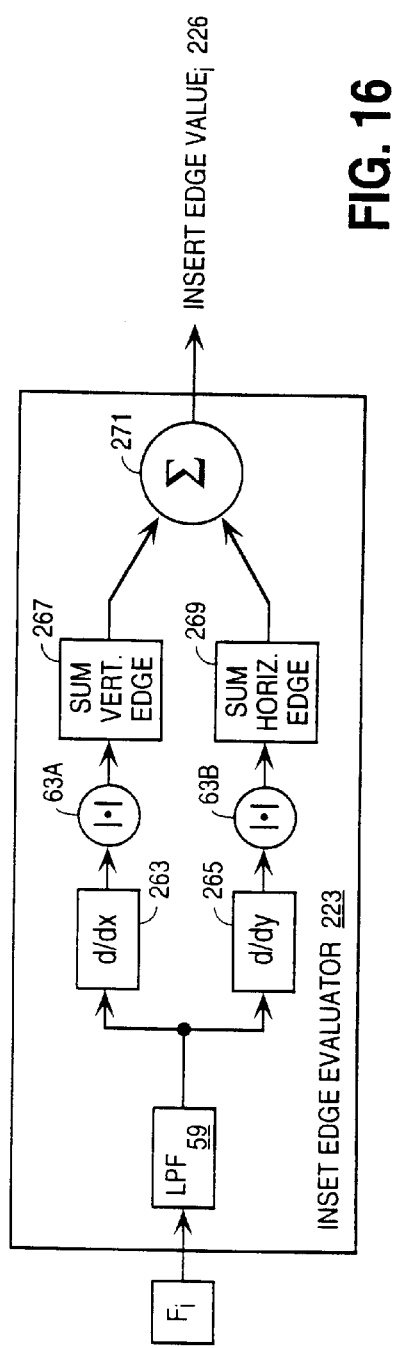
FIG. 16 illustrates an inset-edge evaluator according to one embodiment.

FIG. 16 illustrates an inset edge evaluator 223 according to one embodiment. In a preferred implementation, the inset edge evaluator 223 operates on each successive grayscale-converted frame of the video input ($F_i$). The frame is first blurred by a low-pass filtering stage 59, and then independently differentiated in the vertical and horizontal directions through the use of appropriate convolution operations in differentiation stages 263 and 265. For example, to differentiate in the horizontal direction, a convolution kernel of the form [½, 0,–½] may be used in horizontal differentiation stage 263, while to differentiate in the vertical direction, a vertically oriented version of the same kernel may be used in vertical differentiation stage 265. The output of the horizontal differentiation stage 263 is passed to an absolute value stage 63A which outputs an absolute-valued differentiated frame. An integration stage 267 forms a scalar value that is the sum of the pixels within the vertical edge area of the output of the absolute value stage 63A. The output of the vertical differentiation stage 265 is similarly passed to an absolute value stage 63B and then to an integration stage 269 which forms a scalar value that is the sum of the pixels within the horizontal edge area of the output of the absolute value stage 63B. The outputs of the two integration stages 267, 269 are summed together in stage 271 to form the inset edge value 226 (INSET_EDGE_VALUE$_i$).

Figure 17:
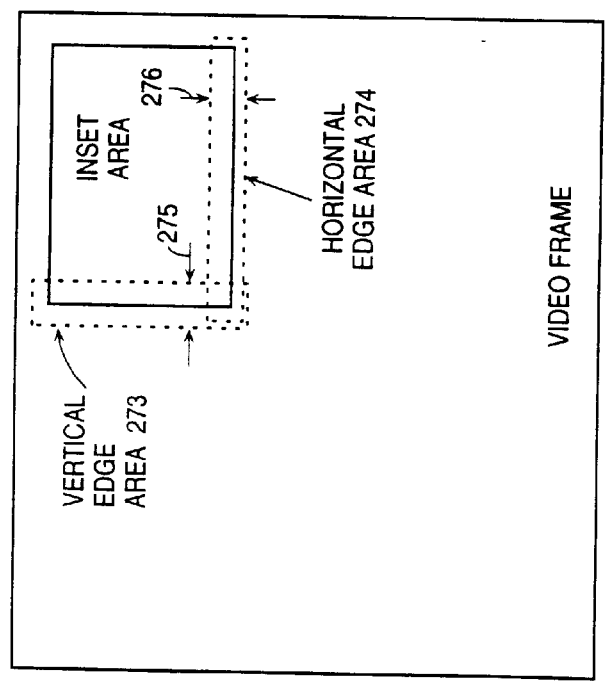
FIG. 17 illustrates the locations of the vertical and horizontal edge areas that define the summation areas for the inset edge evaluator of FIG. 16.

FIG. 17 illustrates the locations of the vertical and horizontal edge areas 273, 274 that define the summation areas for the inset edge evaluator 223 of FIG. 16. In a preferred embodiment, the vertical edge area 273 is a rectangular region centered horizontally on the vertical edge of the inset area that is closest to the center of the video frame. The width 275 of the vertical edge area 276 is preferably a predetermined constant fraction of the video frame size. The horizontal edge area 274 is a rectangular region centered vertically on the horizontal edge of the inset area that is closest to the center of the video frame. The height 276 of the horizontal edge area is preferably a predetermined constant fraction of the video frame size.

Inset Detect Attribute Assignment

Figure 18:
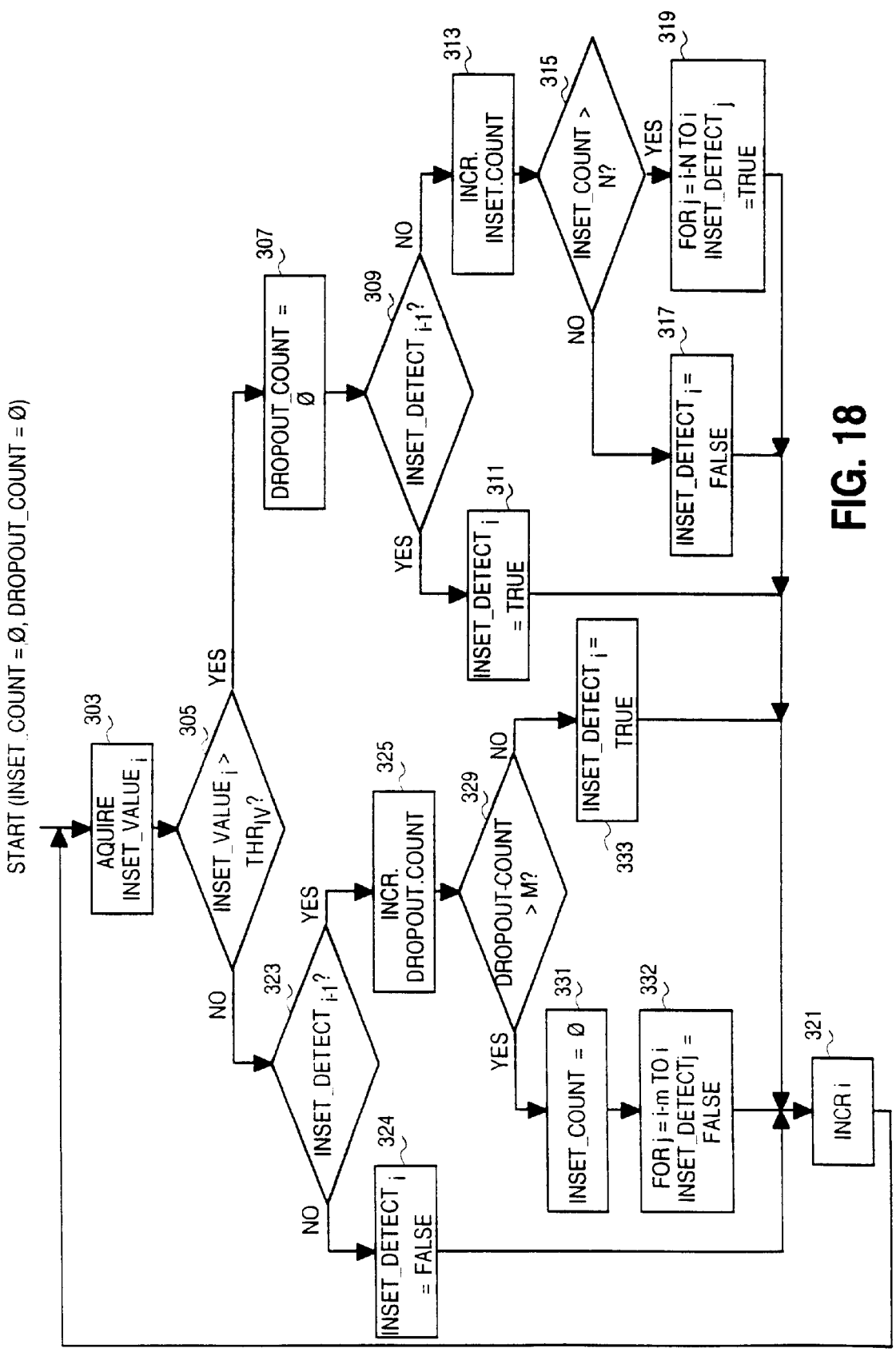
FIG. 18 is a flow diagram of the attribute assignment stage of FIG. 14 according to one embodiment.

FIG. 18 is a flow diagram of the attribute assignment stage according to one embodiment. Two counter-values, INSET_COUNT and DROPOUT_COUNT, are initialized to zero for each video to be processed. INSET_COUNT indicates how many consecutive frames have an inset value greater than a threshold (THR$_{IV}$), while DROPOUT_COUNT indicates how many consecutive frames have an inset value less than or equal to the threshold. These two counter values are used to prevent glitches in the assignment of the INSET_DETECT attribute by requiring that a threshold number of frames satisfy the video inset criteria before setting the INSET_DETECT attribute for those frames to TRUE and by requiring that a threshold number of frames fail to satisfy the video inset criteria before setting the INSET_DETECT attribute for those frames to FALSE.

Starting at block 303, the inset value (INSET_VALUE$_i$) is received from the multiplication stage 227 of the inset detector 220. At decision block 305, the inset value is compared with the inset value threshold (THR$_{IV}$). If the inset value exceeds the threshold, the video inset is tentatively deemed to be present and DROPOUT_COUNT is reset to zero at block 307. The INSET_DETECT$_{i-1}$ value for the prior frame $F_{i-1}$ is checked at decision block 309. If the value is TRUE, then the INSET_DETECT$_i$ for frame $F_i$ is also set to TRUE at block 311. If INSET_DETECT$_{i-1}$ is FALSE, then INSET_COUNT is incremented at block 313 and compared with a predetermined threshold count value N at decision block 315. If INSET_COUNT exceeds N, then INSET_DETECT$_j$ is set to TRUE for all j in the range i-N to i at block 319. If INSET_COUNT does not exceed N, then INSET_DETECT$_j$ is set to FALSE at block 317.

If the inset value does not exceed the threshold THR$_{IV}$, then at decision block 323 the INSET_DETECT$_{i-1}$ value for the prior frame $F_{i-1}$ is checked. If the value is FALSE, then at block 324 the INSET_DETECT$_i$ value for frame $F_i$ is also set to FALSE. If the INSET DETECT$_{i-1}$ value is TRUE, then DROPOUT_COUNT is incremented at block 325 and compared with a predetermined threshold count value M at block 329. If DROPOUT_COUNT exceeds M, then the INSET_COUNT is set to zero at block 331, and INSET_DETECT, is set to FALSE for all j in the range i-M to i at block 332. If the DROPOUT_COUNT does not exceed M, then INSET_DETECT$_i$ is set to TRUE at block 333. After INSET_DETECT$_i$ is set to TRUE or FALSE (i.e., at any one of blocks 324, 332, 333, 311, 317 or 319), the frame index, i, is incremented at block 321 and processing repeats with the next inset value (INSET_VALUE$_i$) at block 303.

Slide Detection and Generation After Video Inset Detection

Once the presence of a video inset is detected, the slide detection process proceeds as described previously, with the exception that the area in the difference image that corresponds to the video inset location is set to zero prior to decimation and thresholding in the foreground change detector. Slide generation also proceeds as described previously, except that the area in the slide that corresponds to the video inset location is not averaged across multiple frames, but rather copied from a single representative frame extracted from the video segment in which the slide is detected. For example, the representative frame may be the first frame of the detected slide segment.

Extraction of Video Inset Overlay for Subsequent Processing and Display

Figure 19:
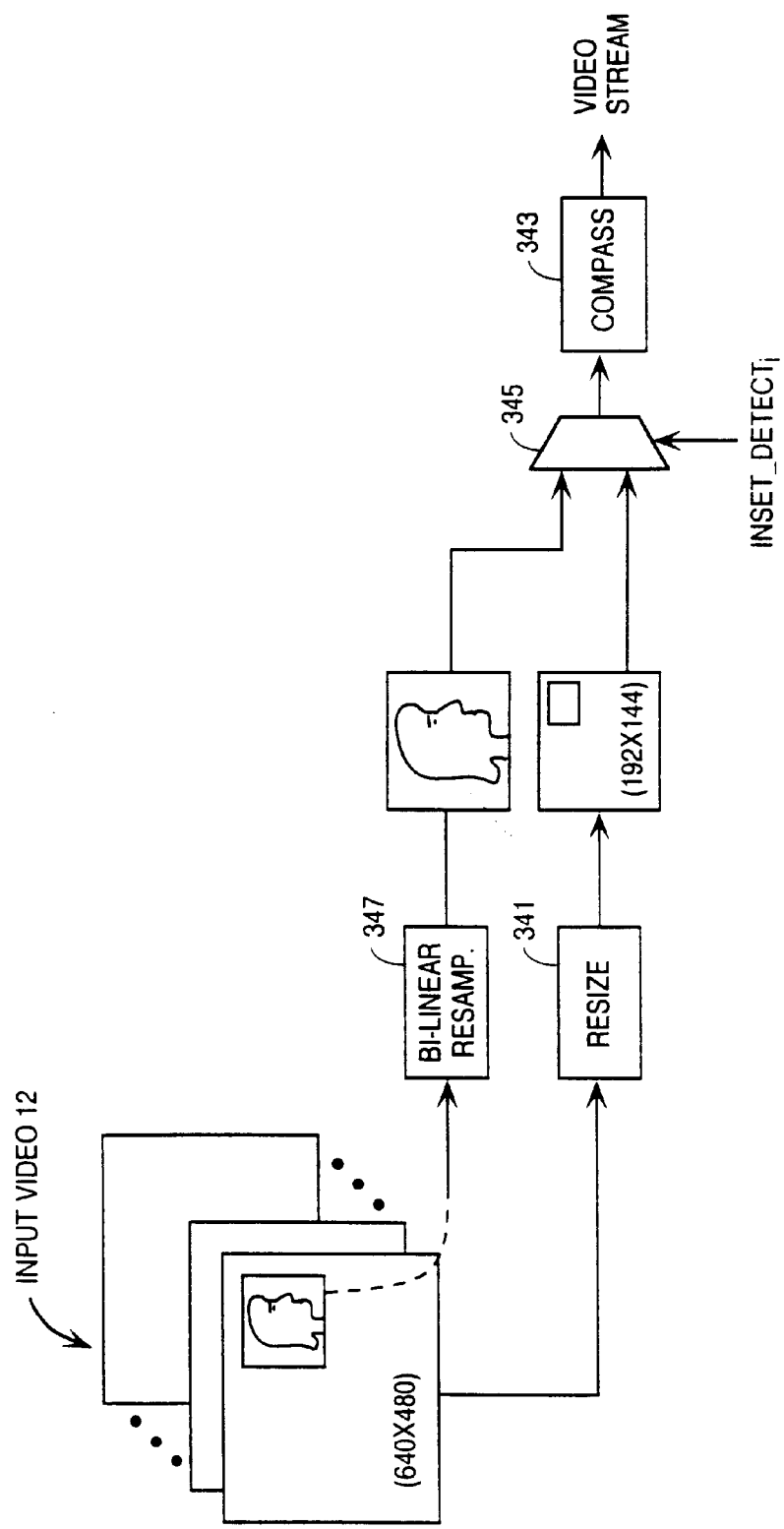
FIG. 19 illustrates a technique for creating a second video sequence by zooming the contents of a video inset area.

FIG. 19 illustrates a technique for creating a second video sequence by zooming (through, for example, a bilinear resampling technique in stage 347) the contents of a video inset area from each successive frame of a video input 12 for which a video inset overlay is detected. The inset frame may be zoomed to the size of the original video frame, or, as shown in FIG. 19, zoomed to match the size to which the original frame would otherwise have been resized. Multiplexer 345 graphically illustrates the alternate selection of either the resized original frame or the zoomed inset frame according to whether a video inset overlay was detected for the subject frame, thereby producing a second video sequence that is different from the video input 12. In one embodiment, a compression stage 343 is used to compress the frames of the second video sequence before they are transmitted or further processed.

In one embodiment, the second video sequence is substituted for the original video input 12 during playback. The advantage of this technique is that the speaker, present in the inset of the video inset, will be much more clearly visible in the second video sequence if the inset is zoomed to a larger frame size, especially if the video input is to be compressed prior to playback. Moreover, slides which form the non-inset area of the video input 12 can be extracted using the techniques described above and depicted in a separate presentation window (e.g., window 205 of FIG. 12) so that it is unnecessary to show the slides as part of the video playback. Thus, an original video that contains a relatively small video inset overlaid on a set of relatively low resolution still images is automatically converted to separate, but time correlated presentations of relatively high quality slides and an enlarged video.

Having described a technique for automatically detecting slides in a video input, even in the presence of a video inset, it should be noted that automatic slide detection is not necessary in all cases and that in alternate embodiments, user input may be provided to initiate slide generation instead of a slide detect signal from an automatic slide detector (e.g., element 21 of FIG. 2). Further, even when automatic slide detection is performed, user input may be provided to indicate frames of a video input that the user desires to include in the output slide set 30.

Figure 20:
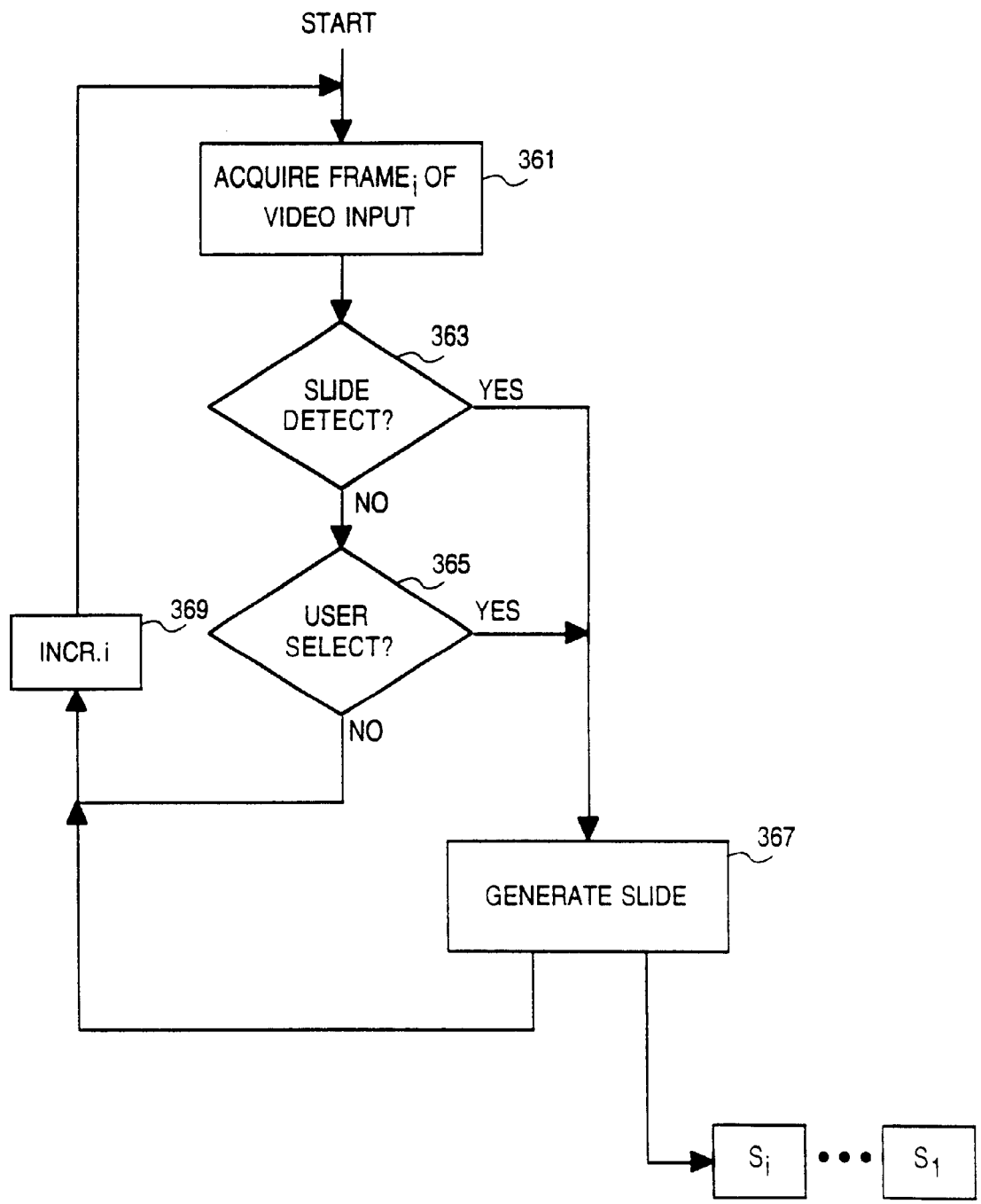
FIG. 20 illustrates a generalized technique for generating a slide set from a video input.

FIG. 20 illustrates a generalized technique for generating a slide set from a video input 12. The successive frames of the video input are preferably sent to a video display device (e.g., a display device for the production station 10 of FIG. 1) for viewing by a human operator, and concurrently to a slide generator (e.g., slide generator 23 of FIG. 2). Thus, after acquiring a frame (FRAME,) of the video input at block 361, automatic slide detection is optionally performed in decision block 363. This may be accomplished as described above in reference to FIGS. 2–6. If a slide is detected, then a slide is generated in block 367 according to techniques described above. If a slide is not detected in decision block 363 or if automatic slide detection is disabled or omitted from the system altogether, decision block 365 is entered to determine whether an operator has selected to generate a slide from the current video frame. If the operator has selected to generate a slide, (e.g., by mouse click, keyboard entry or other operator initiated signal), then a slide is generated at block 367. In one embodiment, the current frame is used to generate a slide in response to operator selection.

In a preferred embodiment, the operator-selected slide is correlated to the video input by associating a timecode and duration with the slide that indicate the relative time of the slide's appearance in the video and the length of the video segment in which the slide appears. The timecode may be recorded in a linked list of slide data structures as described above in reference to FIGS. 8 and 10 so that the operator-selected slide may be used to generate a thumbnail image that can be selected by a user to control playback of the final video and slide presentations as discussed above in reference to FIG. 13.

Overview of a Data Processing System

Figure 21:
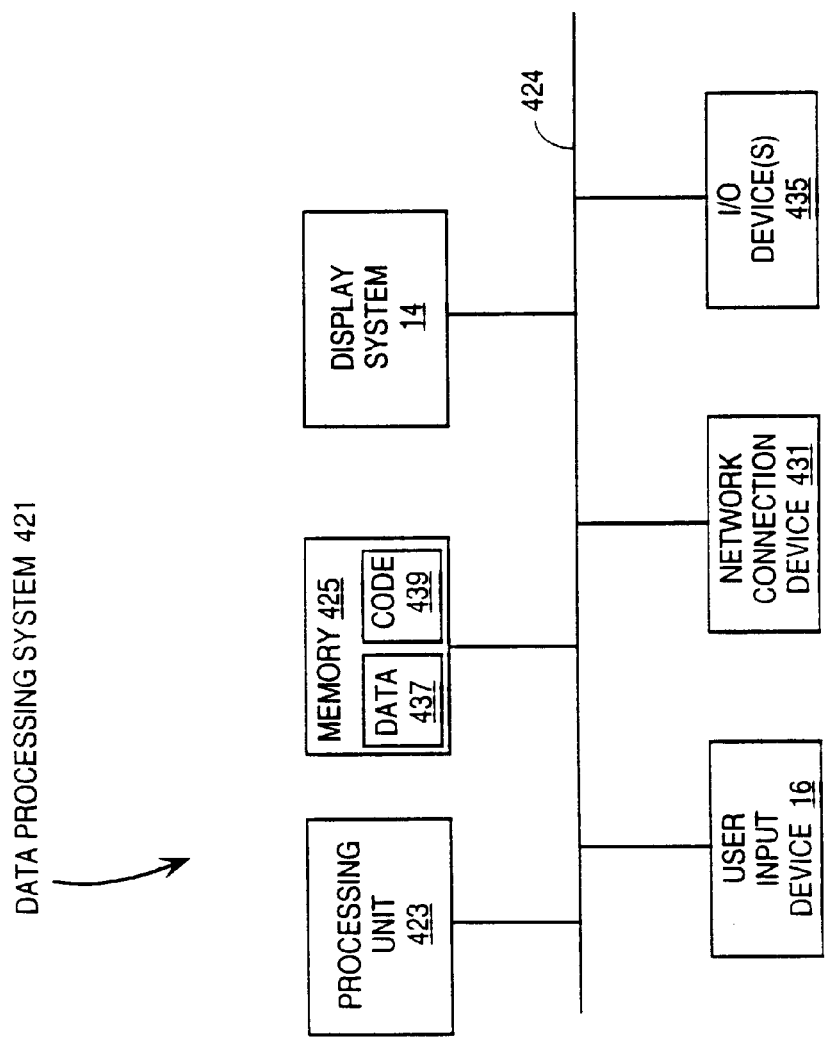
FIG. 21 is a block diagram of a data processing system that can be used to perform slide extraction and slide substitution processing.

FIG. 21 is a block diagram of a data processing system 421 that can be used to perform processing operations used in embodiments of the present invention. The data processing system 421 includes a processing unit 423, memory 425, display system 14, user-input device 16, network connection device 431 and I/O devices 435 each coupled to a bus structure 424. In one embodiment, the processing system 421 is a general purpose computer system such as a desktop or laptop computer or a workstation or larger computer. The user-input device 16 may be a mouse, trackball, stylus, or any other device for manipulating elements displayed on display system 14. The user-input device 16 may also include a keypad or keyboard to allow a user to input alphanumeric data into the processing system 423. I/O devices 435 may include video input circuitry for receiving video input along with other devices according to the specific functions performed by the processing system 421. The display system 14 may include a cathode-ray-tube (CRT), a flat panel display or other display device including, but not limited to, a projection device for projecting display information onto a surface for presentation to a viewing audience.

The processing unit 423 may include one or more general purpose processors, one or more digital signal processors or any other devices capable of executing a sequence of instructions. When programmed with appropriate instructions, the processing unit may be used to implement the above described embodiments of a slide extraction system.

The network connection device 431 may be a modem, area network card or any other device for coupling the data processing system 421 to a computer network. The network connection device 431 may be used to generate or receive a signal that is propagated via a conductive or wireless media. The propagated signal may be used, for example, for obtaining video, source slides and related information from a server computer on the World Wide Web or other network, for delivering video, output slides and related information to a client computer on the World Wide. Web or other network, or for receiving updated program code or function-extending program code that can be executed by the processing unit 423 to implement embodiments of the present invention.

The memory 425 may include both system memory and non-volatile storage devices such as magnetic tape, magnetic disk, optical disk, electrically erasable programmable read only memory (EEPROM), or any other computer-readable medium. As shown in FIG. 13, the memory 425 may be used to store program code 439 for performing the above-described processing operations required to implement a slide extraction system and to implement the above described user-interface and functionality of an application program. The memory may also be used to store data 437 that may include source slide sets, including internationalized source slides, recorded video, output slide sets generated by the slide extraction system and various intermediate data values and data structures used by the slide extraction system.

In one embodiment, when power is applied to the data processing system 421, operating system program code is loaded from non-volatile storage into system memory by the processing unit 423 or another device, such as a direct memory access controller (not shown). Sequences of instructions comprised by the operating system are then executed by processing unit 423 to load other sequences of instructions, including the above-described application programs, from non-volatile storage into system memory. Thus, embodiments of the present invention may be implemented by obtaining sequences of instructions from a computer-readable medium, including the above-described propagated signal, and executing the sequences of instructions in the processing unit 423.

Having described a data processing system for implementing embodiments of the present invention, it should be noted that the individual processing operations performed therein may also be performed by specific hardware components that contain hard-wired logic to carry out the recited operations or by any combination of programmed processing components and hard-wired logic. Nothing disclosed herein should be construed as limiting the present invention to a single embodiment wherein the recited operations are performed by a specific combination of hardware components.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method of generating a slide from a sequence of video frames, the method comprising:

selecting a still image within at least one frame from the sequence of video frames to be a first slide in a slide presentation, the image being substantially unchanged for a predetermined threshold value;

associating a value with the first slide that indicates a time at which the at least one frame appears in the sequence of video frames;

comparing the first slide against at least one source slide of a set of source slides of the slide presentation used to create a video; and substituting the at least one source slide for the first slide.

2. The method of claim 1 wherein selecting the image within at least one frame of the video to be the first slide comprises selecting the at least one frame to be the first slide in response to user input.

3. The method of claim 1 wherein selecting the image within at least one frame of the video to be the first slide comprises processing frames of the video in a slide detector that automatically identifies a sequence of frames that each contain an image of the first slide, the sequence of frames including the at least one frame.

4. The method of claim 1 wherein selecting the image within at least one frame of the video to be the first slide comprises generating the first slide based on the image.

5. The method of claim 4 wherein generating the first slide based on the image within at least one frame of the video comprises combining images contained in a sequence of frames of the video, the sequence of frames including the at least one frame of the video.

6. The method of claim 1 wherein substituting the at least one source slide for the first slide comprises automatically selecting one of a plurality of different language versions of the at least one source slide according to a language preference specified by a user.

7. The method of claim 1 further comprising:

displaying a thumbnail representation of the first slide in a user interface of a computer system;

receiving user input in the computer system selecting the thumbnail representation of the first slide; and displaying the video starting at a frame of the video that contains the image of the first slide in response to receiving the user input selecting the thumbnail representation of the first slide.

8. The method of claim 7 wherein displaying the video starting at the at least one frame of the video containing the image selected to be the first slide comprises displaying the video at the time indicated by the value associated with the first slide.

9. The method of claim 7 wherein displaying the video starting at the frame of the video that contains the image of the first slide comprises displaying the video at a frame of the video that is an initial frame in a sequence of frames that each include the image of the first slide, the sequence of frames including the at least one frame.

10. The method of claim 1 wherein the value includes a timecode component and a duration component that indicate a starting frame and an ending frame, respectively, of a segment of the video input that includes the image of the first slide.

11. The method of claim 10 wherein the timecode component and the duration component specify respective starting and ending frame numbers of the segment of the video input.

12. The method of claim 10 wherein the timecode component and the duration component specify respective starting and ending times of the segment of the video input relative to the start of the video input.

13. The method of claim 10 wherein the duration value indicates the ending frame by specifying a number of frames in the segment of the video input.

14. The method of claim 10 wherein the duration value indicates the ending frame by specifying an elapsed time relative to the starting frame of the segment of the video input.

15. The method of claim 1 further comprising:

presenting the video in a first display area; and displaying the first slide in a second display area at a time indicated by the value associated with the first slide so that the first slide is displayed concurrently with the at least one frame.

16. The method of claim 15 wherein the first display area and the second display area are located on a single display.

17. A method comprising:

generating a sequence of slides of a slide presentation based on respective segments of a video, each segment including at least a threshold number of frames having a persistent image, the image being substantially unchanged for a predetermined threshold value, wherein each slide is generated based on said persistent image in each respective segment;

associating respective time values with the slides that indicate, for each of the slides, when a corresponding one of the segments appears in the video;

comparing each slide in the sequence of slides to a source slide of a set of source slides of the slide presentation used to create the video; and substituting the source slide for the slide in the sequence of slides.

18. The method of claim 17 further comprising displaying the sequence of slides in synchronization with presentation of the video based on the time values.

19. A method of extracting slides from a video input, the method comprising:

inspecting frames of the video input to automatically identify sequences of the frames that contain respective still images, the still images being substantially unchanged for a predetermined threshold value;

generating respective slides that include the still images, the respective slides forming a set of output slides of a slide presentation;

comparing slides in the set of output slides to identify a slide that is a duplicate of another slide in the set of output slides;

comparing each slide in the set of output slides against slides in a source slide set of the slide presentation to identify a matching one of the slides in the source slide set, the source slide set used to generate a sequence of video frames in the video input that contain the still images included in the slides; and substituting the matching source slide for the slide in the set of output slides.

20. The method of claim 19 further comprising: removing the duplicate from the set of output slides.

21. The method of claim 20 wherein comparing slides to identify a slide that is a duplicate of another slide comprises comparing a first slide in the output set of slides with a second slide in the output set of slides to determine whether a difference between the first and second set of slides is less than a threshold, the second slide being a duplicate of the first slide if the difference is less than the threshold.

22. The method of claim 19 further comprising substituting the source slide for a first slide by selecting one of a plurality of different language versions of the source slide according to a previously entered user-preference value.

23. The method of claim 22 wherein substituting the source slide for a first slide comprises selecting one of a plurality of different descriptor format versions of the source slide according to a previously entered user-preference value.

24. The method of claim 23 wherein selecting one of a plurality of different descriptor format versions of the source slide comprises selecting a markup language version of the source slide.

25. The method of claim 23 wherein selecting one of a plurality of different descriptor format versions of the source slide comprises selecting a version of the source slide in a file format that can be used in a slide generation program of a computer system to render the source slide onto a display of the computer system.

26. The method of claim 19 wherein inspecting frames of the video input to automatically identify sequences of the frames that contain respective still images comprises identifying sequences of the frames for which camera motion effects are less than a predetermined threshold.

27. The method of claim 19 wherein inspecting frames of the video input to automatically identify sequences of the frames that contain respective still images comprises identifying sequences of the frames for which foreground changes in the frames are less than a predetermined threshold.

28. The method of claim 27 wherein identifying sequences of frames for which foreground changes in the frames are less than a predetermined threshold comprises:

generating measures of difference by subtracting frames in the sequences of frames from respective successive frames in the sequences of frames; and determining if the measures of difference exceed the predetermined threshold.

29. The method of claim 27 further comprising:

automatically identifying frames of the video input that include a video inset; and masking the video inset before identifying the sequences of the frames for which the foreground changes in the frames are less than the predetermined threshold.

30. The method of claim 29 wherein automatically identifying frames of the video input that include a video inset comprises evaluating pixel values along a border of an insert area within the frames of the video input to determine if changes in pixel intensity along the border exceed a predetermined threshold.

31. The method of claim 30 wherein automatically identifying frames of the video input that include a video inset comprises setting an inset detect attribute to indicate that a video inset is present for each frame of the video input for which the changes in pixel intensity along the border exceed the predetermined threshold.

32. The method of claim 30 wherein the border has a frame location and dimension that are specified by a user.

33. The method of claim 29 further comprising:

displaying a frame of the video input that contains a video inset on a display of a computer system; and receiving user input specifying a border of the video inset, the border of the video inset being the border of the inset area along which changes in pixel intensity are evaluated.

34. The method of claim 19 wherein inspecting the frames of the video input to automatically identify sequences of the frames that contain respective still images comprises detecting frames within the sequences of frames that include a video inset overlaid on one of the still images, the method further comprising generating a video presentation based on images in the video inset that is different from the video input.

35. The method of claim 34 further comprising:
   displaying the slides in a slide presentation window on a display of a computer system; and
   displaying the video presentation based on images in the video inset in a video presentation window of the computer system concurrently with displaying the slides in the slide presentation window.

36. The method of claim 35 wherein displaying the slides in the slide presentation window and the video presentation in the video presentation window comprises displaying the slides and the video presentation according to respective times of appearance of subject matter of the slide and the video presentation in the video input.

37. An apparatus comprising:
   a video receiving circuitry to receive a video input;
   a slide detector to detect a sequence of frames in the video input remaining substantially unchanged for a predetermined threshold value;
   a slide generator to generate a first slide of a slide presentation based on at least one frame from the sequence of frames of the video input and to associate a value with the first slide that indicates a time at which the at least one frame appears in the video input; and
   a slide coalescing stage to compare slides in the set of slides to determine if one slide of the set of slides is a duplicate of another slide in the set of slides;
   a slide substitution stage coupled to receive the first slide from the slide generator, the substitution stage being configured to substitute a source slide for the first slide, the source slide being a slide from the slide presentation used to create the video input.

38. The apparatus of claim 37 wherein the slide generator is configured to generate the first slide in response to user input.

39. The apparatus of claim 37 further comprising a slide detector to automatically identify a sequence of frames in the video input that each contain an image of the first slide and to signal the slide generator to generate the first slide based on the at least one frame, the sequence of frames including the at least one frame.

40. The apparatus of claim 39 wherein the slide generator includes a combining stage coupled to receive the sequence of frames identified by the slide detector and to combine the images contained in the sequence of frames to generate the first slide.

41. The apparatus of claim 40 wherein the combining stage is an averager that combines the images contained in the sequence of frames by averaging the constituent pixel values in the images.

42. The apparatus of claim 40 wherein the slide generator further includes an upsampling stage coupled to receive the sequence of frames identified by the slide detector and to upsample the images from the sequence of frames to higher resolution before the frames are received in the combining stage.

43. The apparatus of claim 39 further comprising an inset detector coupled to receive the video input and configured to automatically identify frames of the video input that include a video inset and to mask the video inset before outputting the frames to the slide detector.

44. The apparatus of claim 37 wherein the slide generator further includes a sharpening stage to amplify high frequency components of the first slide.

45. The apparatus of claim 37 further comprising a slide substitution stage coupled to receive the first slide from the slide generator, the substitution stage being configured to substitute a source slide for the first slide, the source slide being a slide used to create the video input.

46. The apparatus of claim 37 wherein the substitution stage is further configured to automatically select one a plurality of different language versions of the source slide according to a language, preference specified by a user.

47. The apparatus of claim 37 wherein the source slide is formatted in descriptive format that can be used by a computer application program to generate the image of the first slide.

48. The apparatus of claim 47 wherein the descriptive format is a markup language representation of the image of the first file.

49. The apparatus of claim 37 wherein the slide coalescing stage being configured to remove the duplicate from the set of slides.

50. The apparatus of claim 37 further comprising a slide coalescing stage coupled to receive the first slide from the slide generator and to determine if the first slide is a build slide that includes both an image of a second slide output by the slide generator and a build region containing additional information not present in the second slide.

51. The apparatus of claim 50 wherein the slide coalescing stage is configured to associate build information with the first slide, the build information being representative of the build region.

52. The apparatus of claim 51 further comprising:
   a network communications device to transmit slides output from the slide coalescing stage to a slide presentation device via a communications network, the slides including the first slide and the second slide; and
   a processing unit to determine that the build information is associated with the first slide and to select the build information to be transmitted to the slide presentation device instead of the first slide, the first slide being constructable; within the slide presentation device, from the build information and the second slide.

53. The apparatus of claim 52 wherein the slide presentation device is a computer system.

54. The apparatus of claim 37 wherein the slide generator is implemented by a programmed processing unit.

55. An article of manufacture including one or more computer-readable media that embody a program of instructions for generating a slide from a video, wherein the program of instructions, when executed by a processing unit in a data processing system, causes the processing unit to:
   select at least one image within one frame of the video to be a first slide of a slide presentation, the image being substantially unchanged for a predetermined threshold value;
   associate a value with the first slide that indicates a time at which the at least one image within one frame appears in the video; and
   compare the first slide against at least one source slide of a set of source slides of the slide presentation used to create the video; and
   substitute the at least one source slide for the first slide.

56. An article of manufacture including one or more computer-readable media that embody a program of instructions for extracting slides form a video input, wherein the program of instructions, when executed by a processing unit in a data processing system, causes the processing unit to:
   inspect frames of the video input to automatically identify sequences of the frames that contain respective still images, the images being substantially unchanged for a predetermined threshold value;

generate respective slides that include the still images, the respective slides forming a set of output slides of a slide presentation;

compare slides in the set of output slides to identify a slide that is a duplicate of another slide in the set of output slides;

compare each slide in the set of output slides against slides in a source slide set of the slide presentation to identify a matching one of the slides in the source slide set, the source slide set used to generate a sequence of video frames in the video input that contain the still images included in the slides; and substitute the matching source slide for the slide in the set of output slides.

57. The article of claim 56 wherein the computer-readable media includes a propagated signal having the program of instructions encoded therein.

58. The article of claim 56 wherein the program of instructions, when executed by the processing unit in the data processing system, causes the processing unit further to remove the duplicate from the output set of slides.

* * * * *